(12) United States Patent
Blackstone

(10) Patent No.: US 9,422,963 B2
(45) Date of Patent: Aug. 23, 2016

(54) EXTENDABLE INTERLOCKING STRUCTURES AND METHODS

(71) Applicant: Philip Aaron Blackstone, Rockwall, TX (US)

(72) Inventor: Philip Aaron Blackstone, Rockwall, TX (US)

(73) Assignee: Philip Aaron Blackstone, Rockwall, TX (US)

(*) Notice: Subject to any disclaimer, the term of this patent is extended or adjusted under 35 U.S.C. 154(b) by 747 days.

(21) Appl. No.: 13/838,734

(22) Filed: Mar. 15, 2013

(65) Prior Publication Data

US 2014/0259609 A1    Sep. 18, 2014

(51) Int. Cl.
| | |
|---|---|
| F16B 17/00 | (2006.01) |
| F16M 13/00 | (2006.01) |
| F16B 37/08 | (2006.01) |
| F16M 11/24 | (2006.01) |
| F16G 13/07 | (2006.01) |
| F16G 13/20 | (2006.01) |

(52) U.S. Cl.
CPC ............. *F16B 17/00* (2013.01); *F16B 37/0885* (2013.01); *F16B 37/0892* (2013.01); *F16G 13/07* (2013.01); *F16G 13/20* (2013.01); *F16M 11/24* (2013.01); *F16M 13/00* (2013.01); *Y10T 29/49826* (2015.01); *Y10T 403/70* (2015.01)

(58) Field of Classification Search
CPC ........ F16G 13/07; F16G 13/20; F16M 13/00; F16M 17/00; F16M 11/24; F16B 37/0885; F16B 37/0892; E01D 1/00; B62D 33/027; Y10T 403/70; Y10T 74/19819; Y10T 74/19716; B66F 3/06; B66F 13/005; F16H 19/0636
See application file for complete search history.

(56) References Cited

U.S. PATENT DOCUMENTS

| | | | | |
|---|---|---|---|---|
| 2,574,657 | A | * 11/1951 | Pierce | ...................... B66F 3/06 254/1 |
| 3,016,988 | A | 1/1962 | Browning | |
| 3,645,146 | A | 2/1972 | Nagin | |
| 5,347,770 | A | 9/1994 | McDonnell et al. | |
| 8,069,954 | B2 | 12/2011 | Kempf | |
| 2006/0261207 | A1 | 11/2006 | Woodruff et al. | |

* cited by examiner

*Primary Examiner* — Jacob Cigna
*Assistant Examiner* — Lee A Holly
(74) *Attorney, Agent, or Firm* — Slater Matsil, LLP

(57) ABSTRACT

Embodiments of the present disclosure include extendable structures and methods of forming an extendable structure. In accordance with an embodiment, an extendable structure includes a first chain of interlocking components including a first interlocking component, a second chain of interlocking components including a second interlocking component configured to mate to the bottom surface the first interlocking component, and a third chain of interlocking components including a third interlocking component configured to mate to the bottom surfaces of the first interlocking component and the second interlocking component. The extendable structure may include more than three chains of interlocking components and each chain of interlocking components may comprise three or more interlocking components.

20 Claims, 24 Drawing Sheets

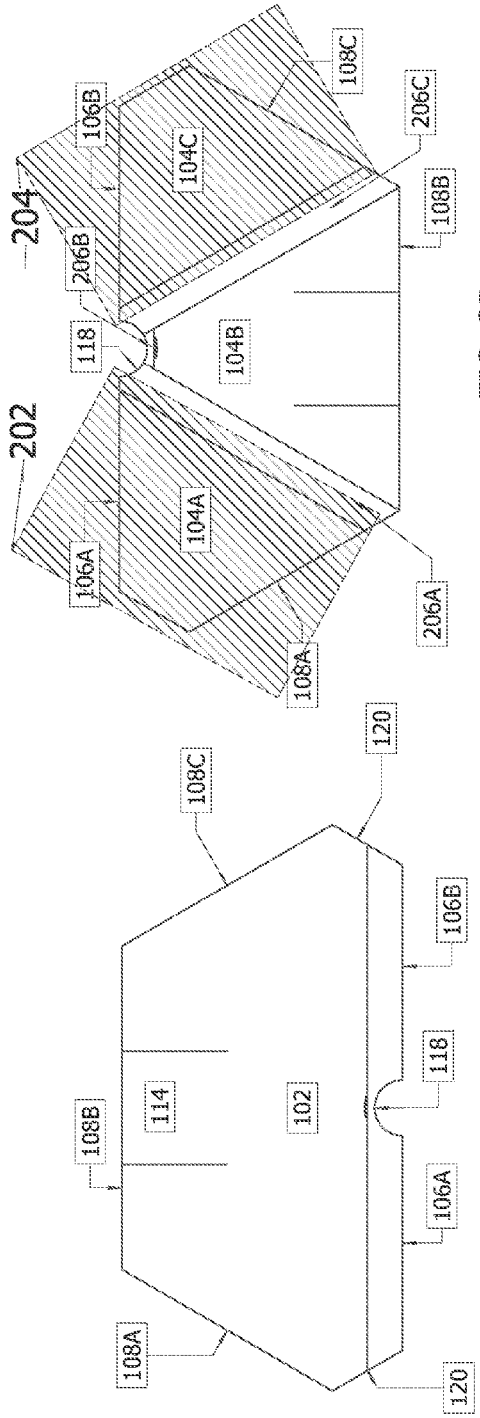
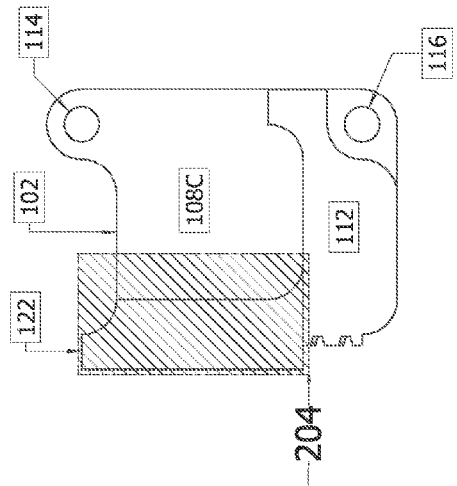
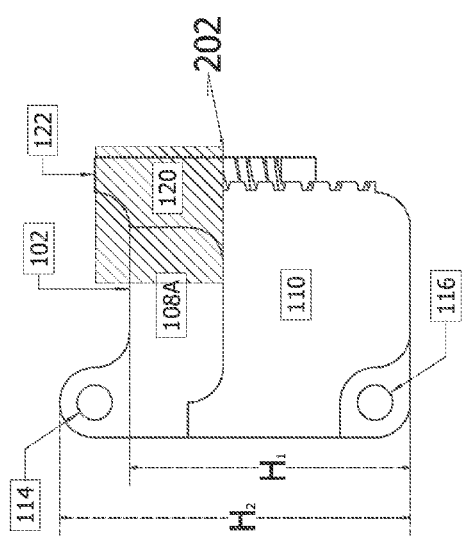
FIG. 2A  FIG. 2B  FIG. 2C  FIG. 2D

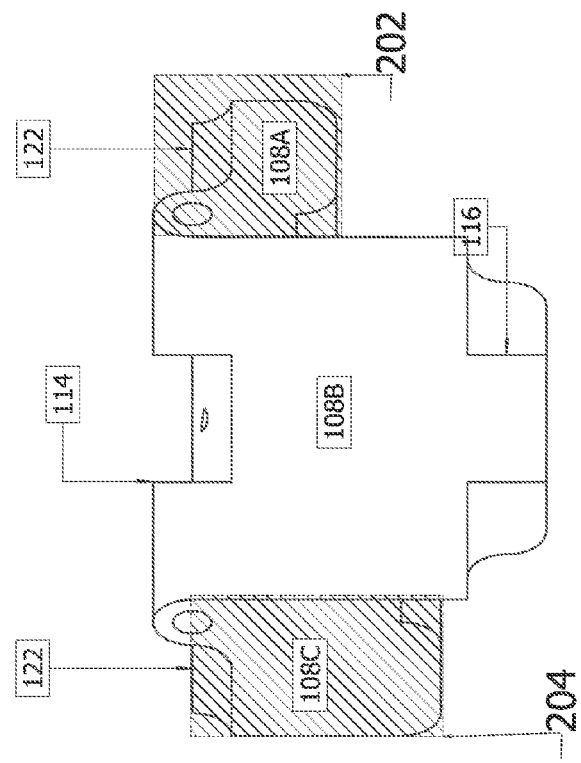
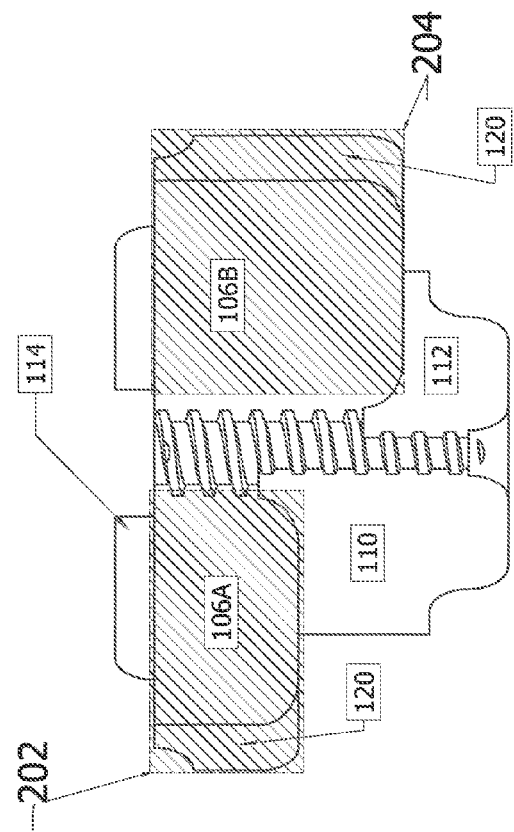
FIG. 2E
FIG. 2F

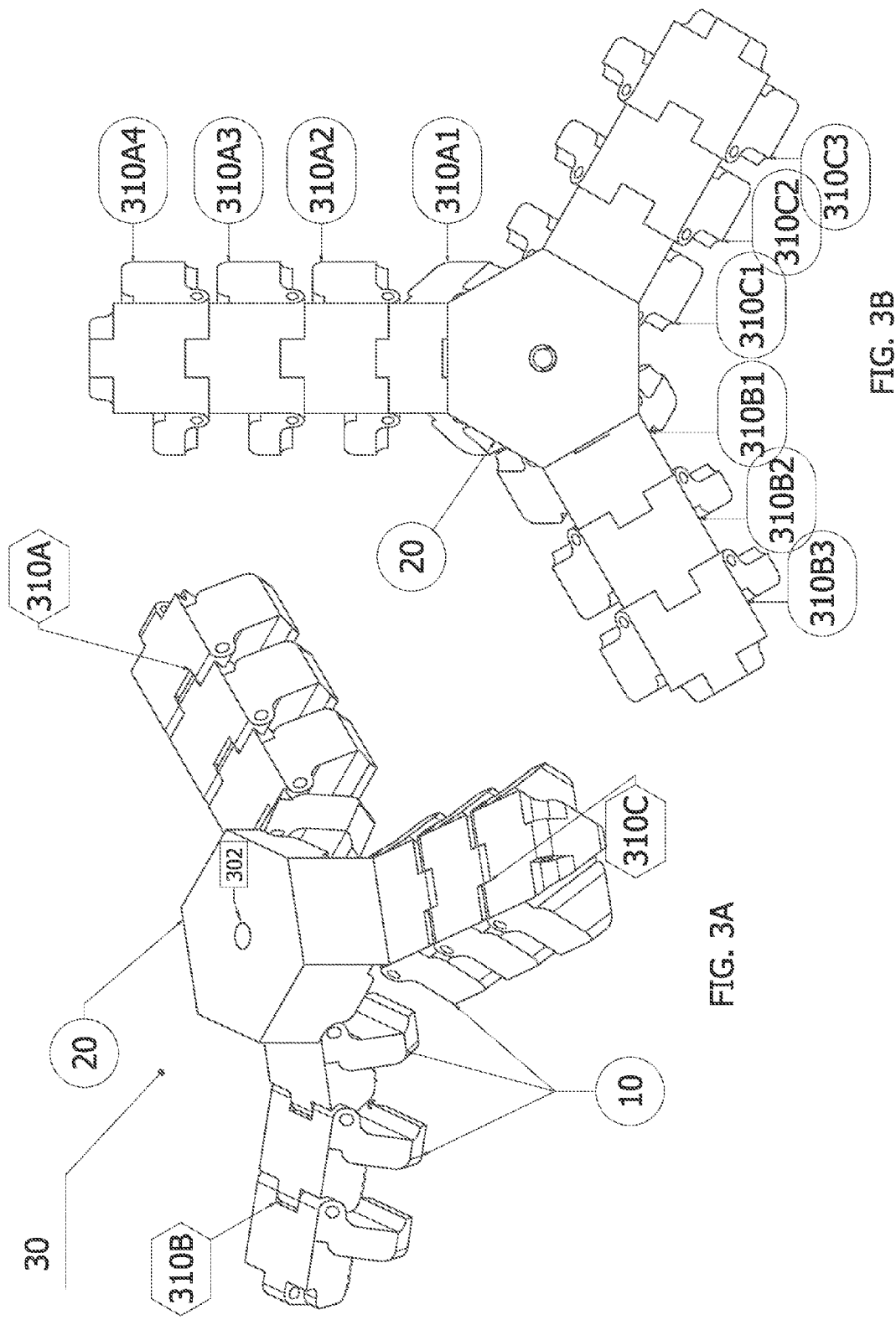

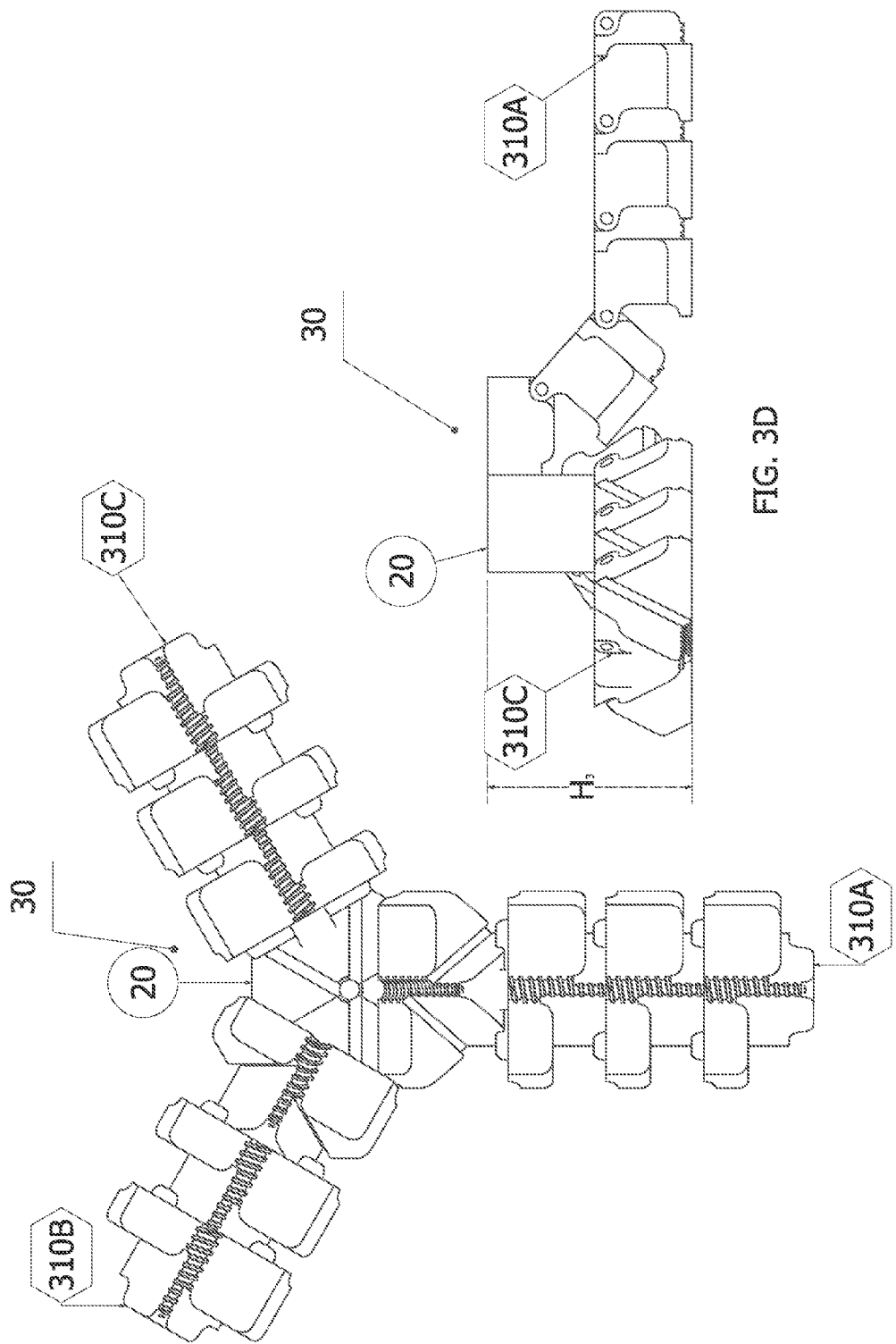

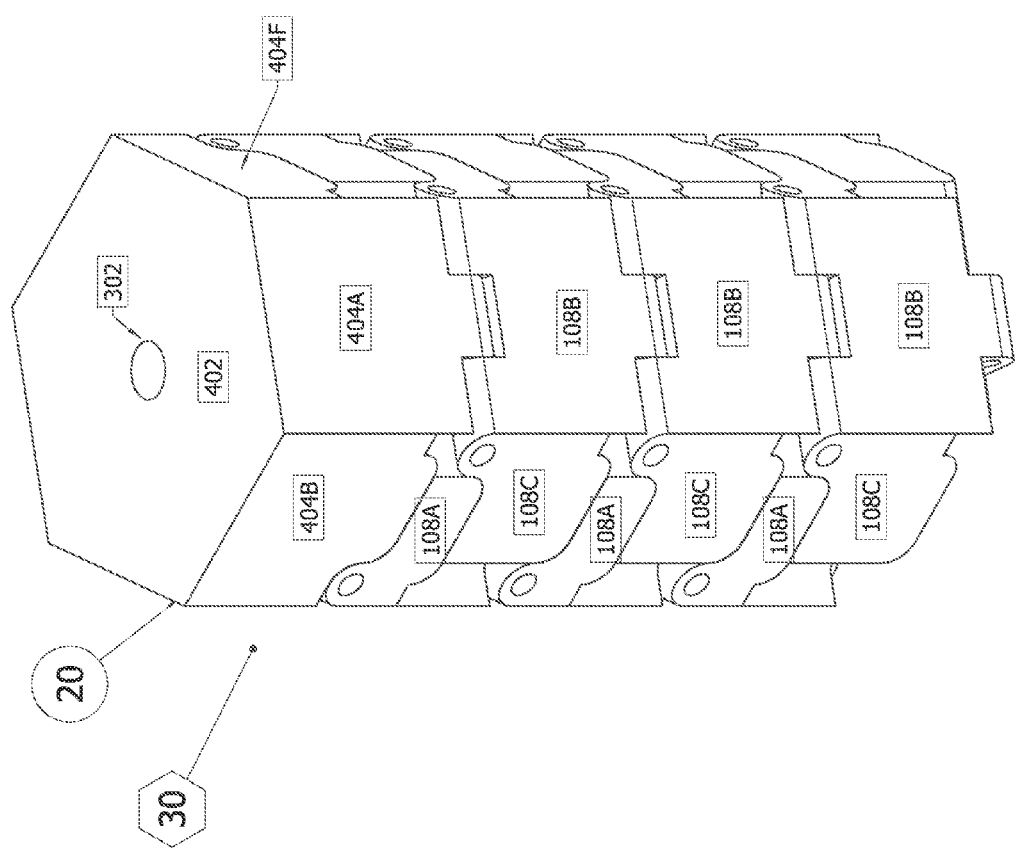

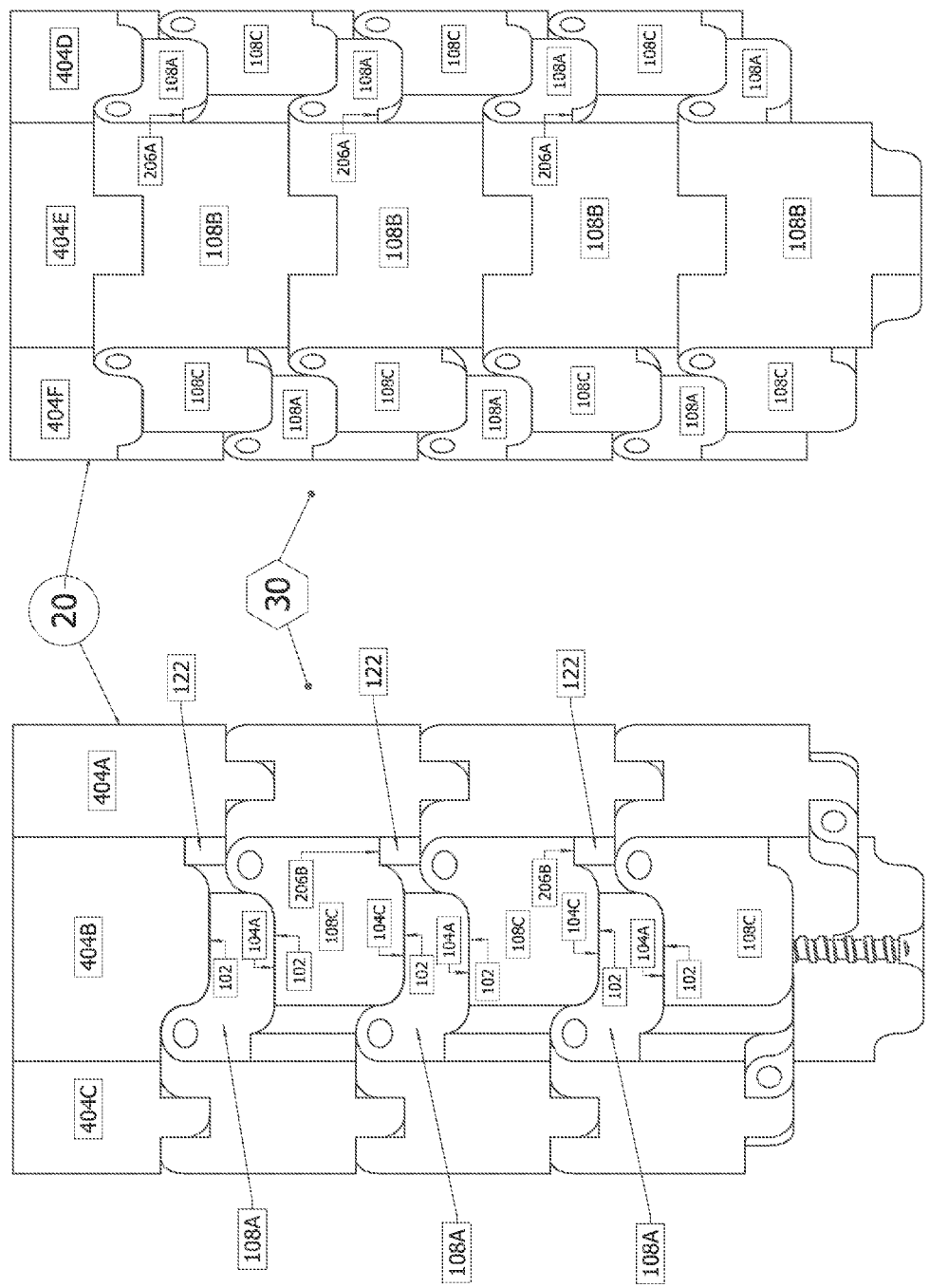

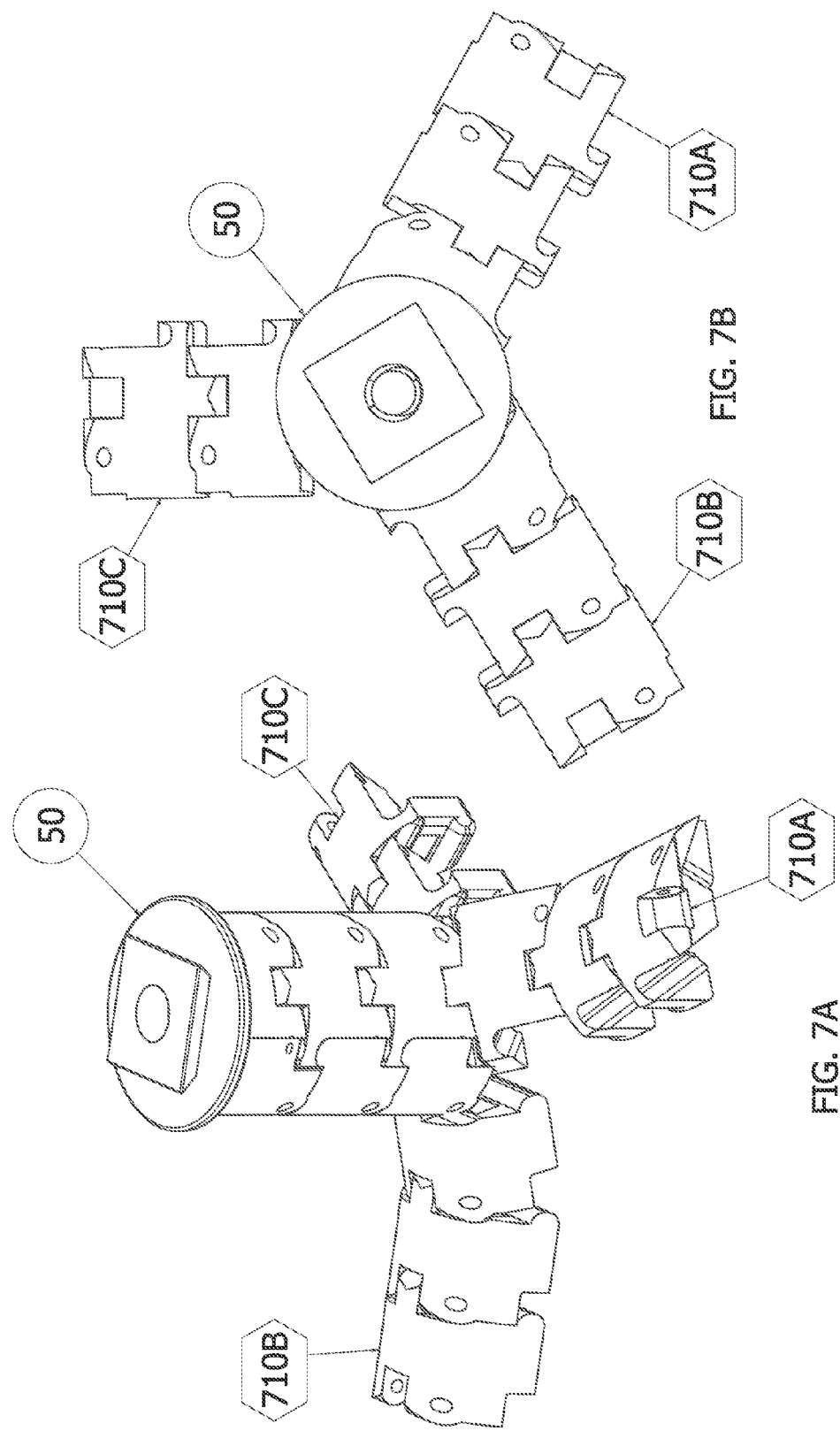

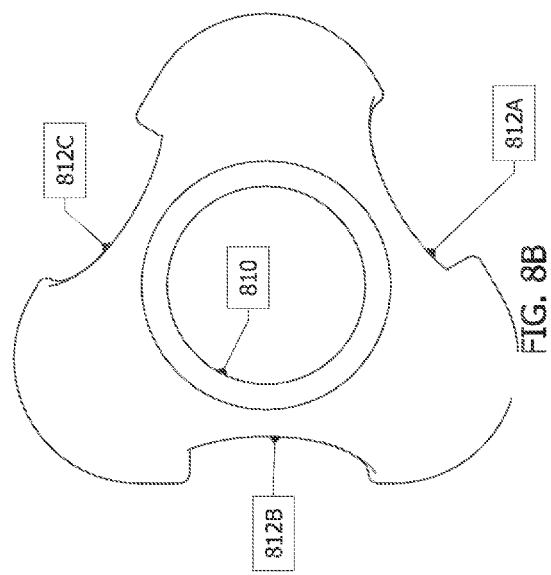
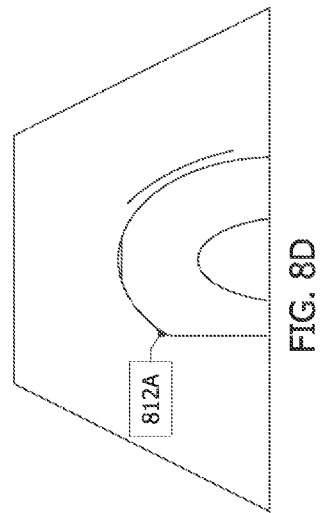
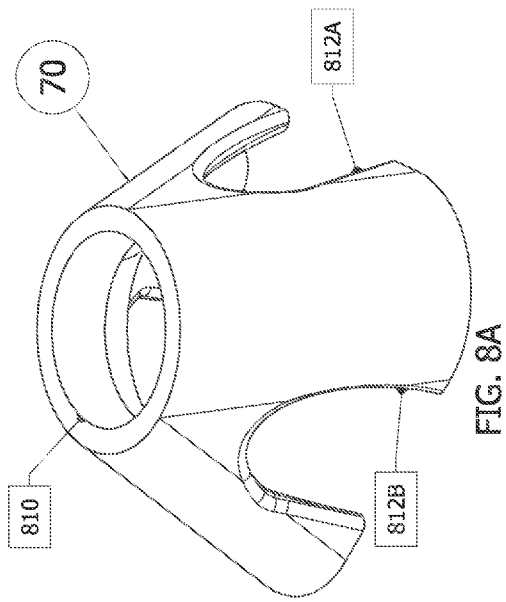
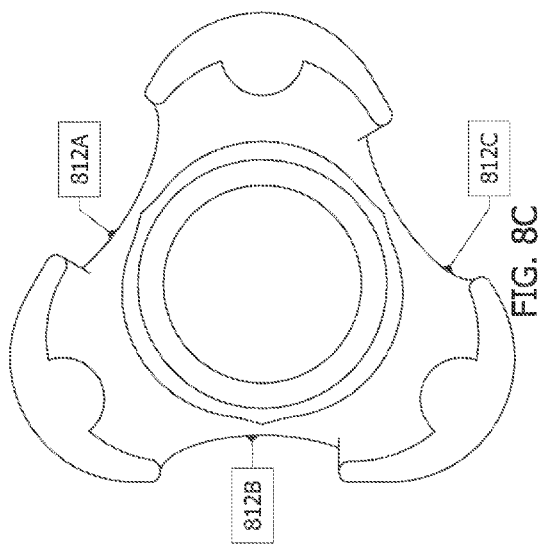

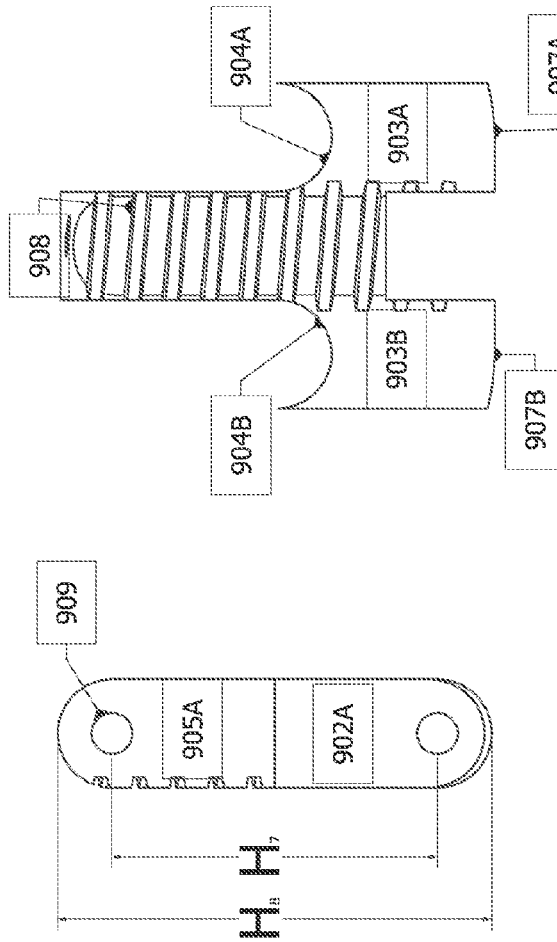
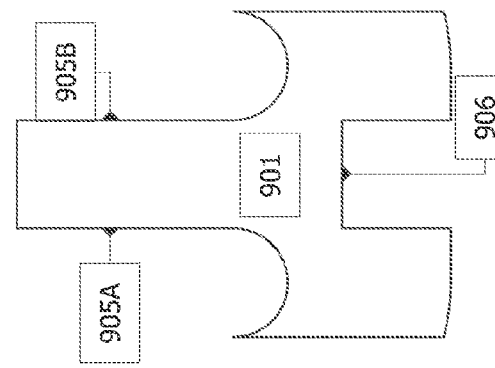
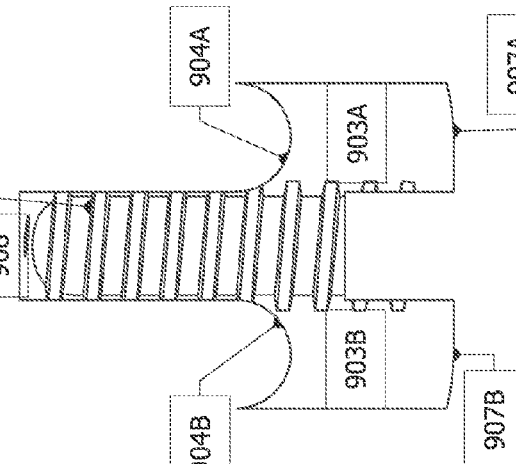
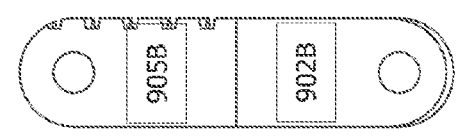
FIG. 9E  FIG. 9F  FIG. 9G  FIG. 9H  FIG. 9I  FIG. 9J

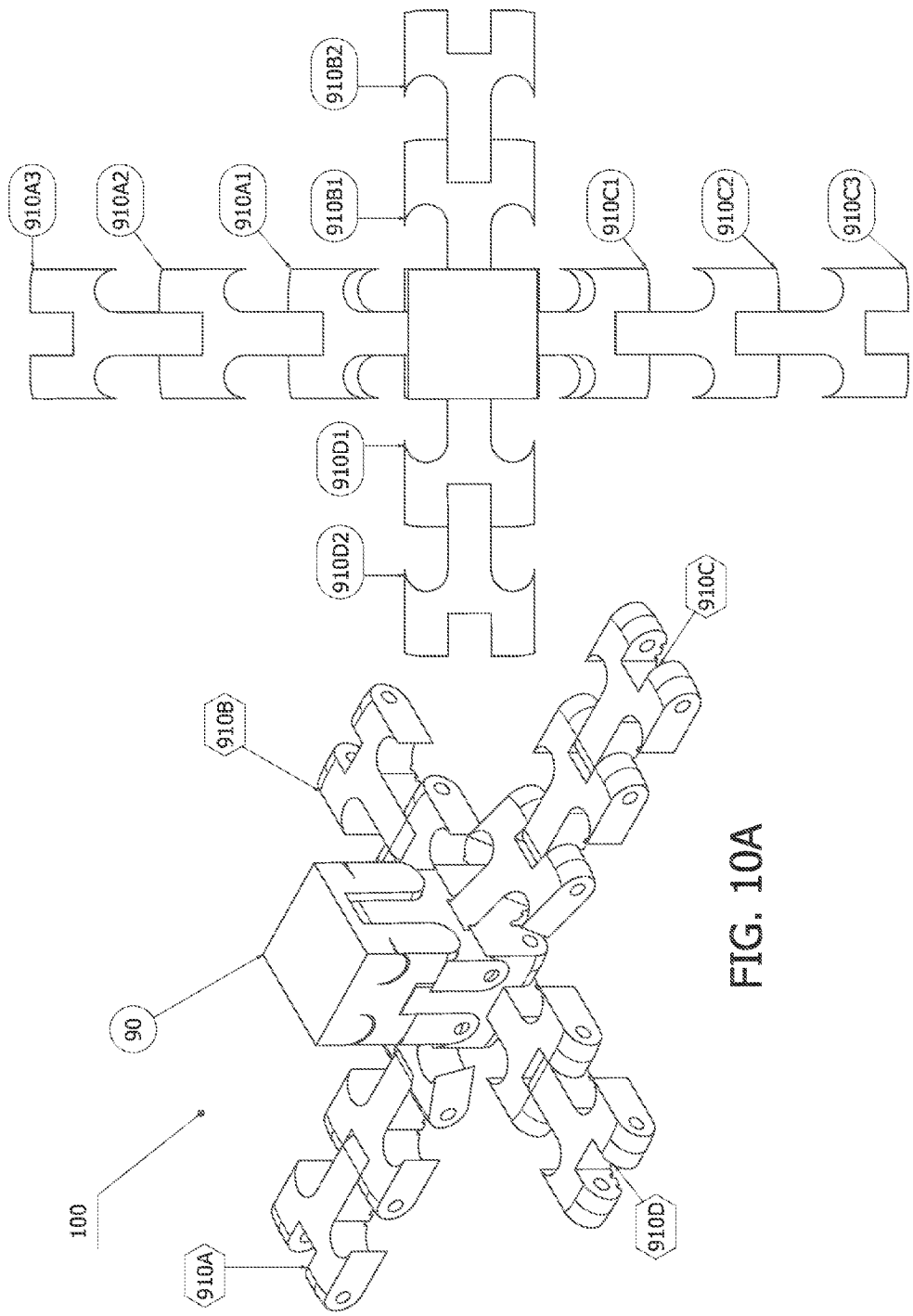

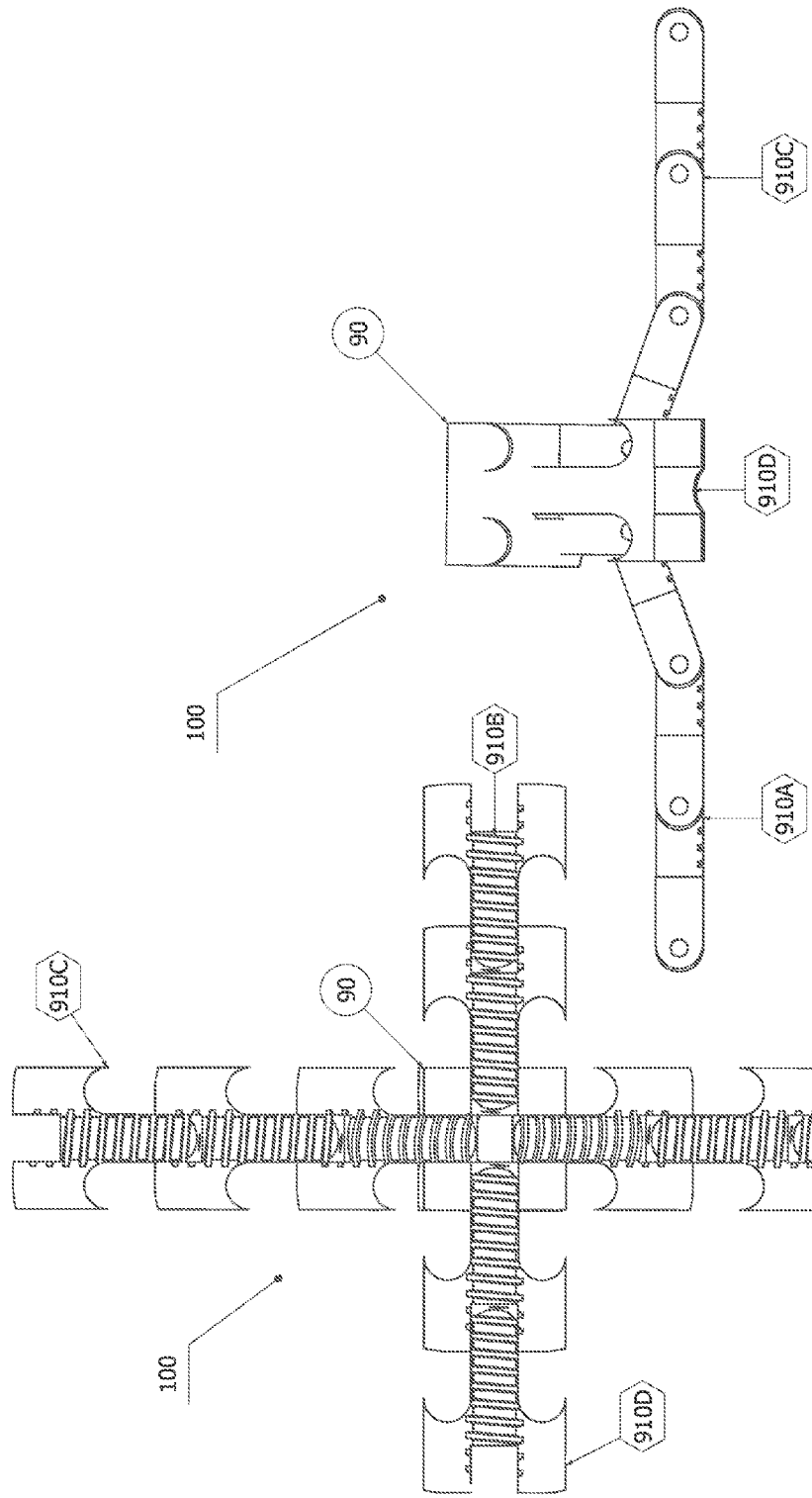

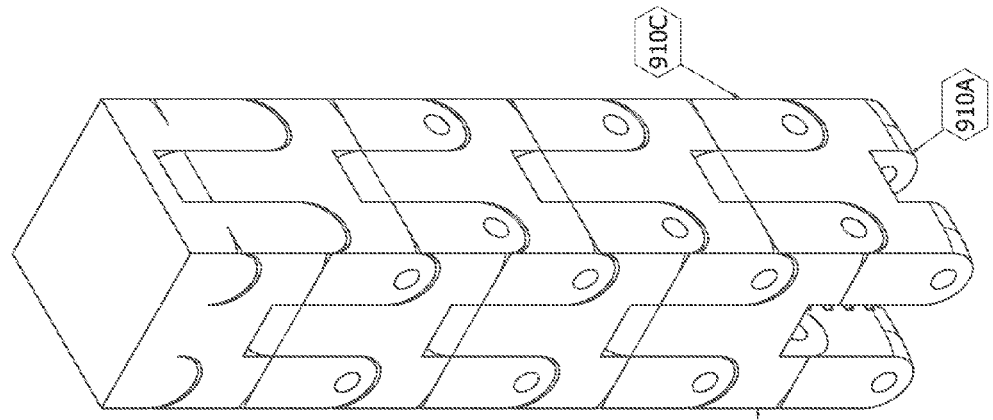
FIG. 10H
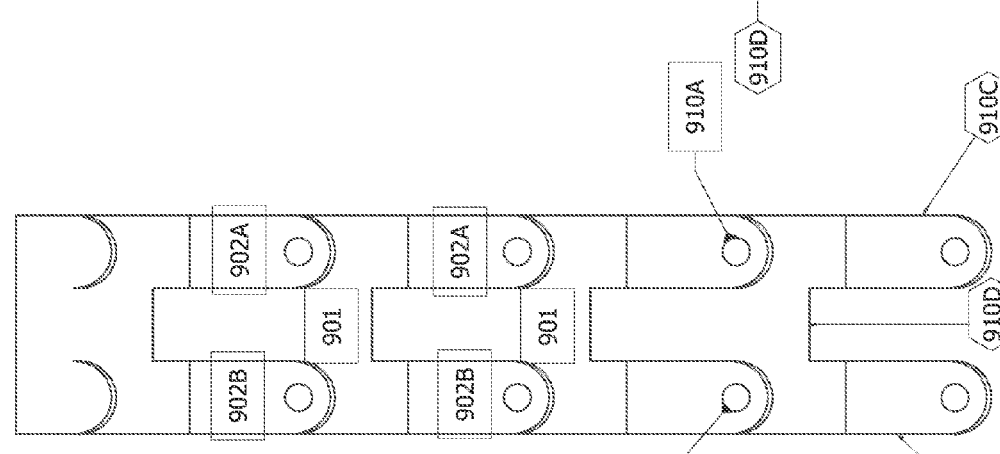
FIG. 10G
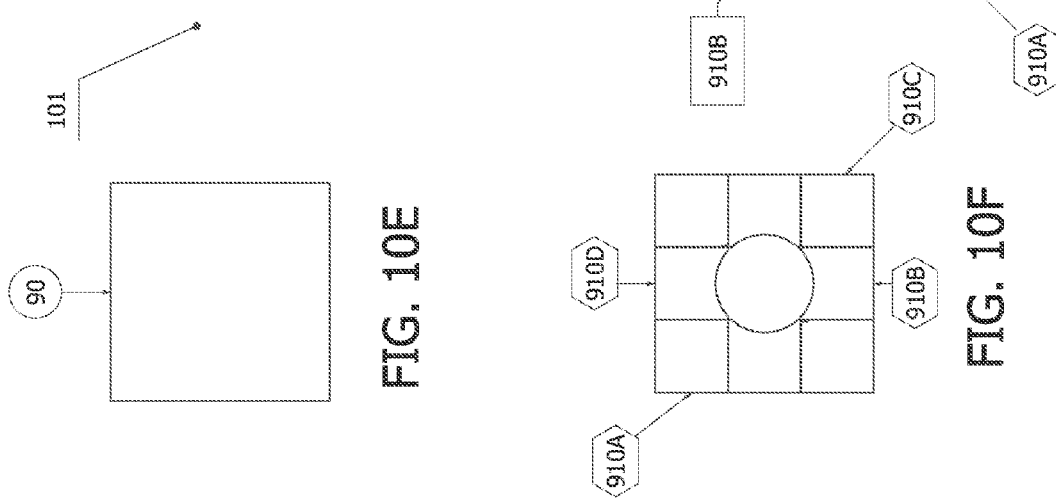
FIG. 10E
FIG. 10F

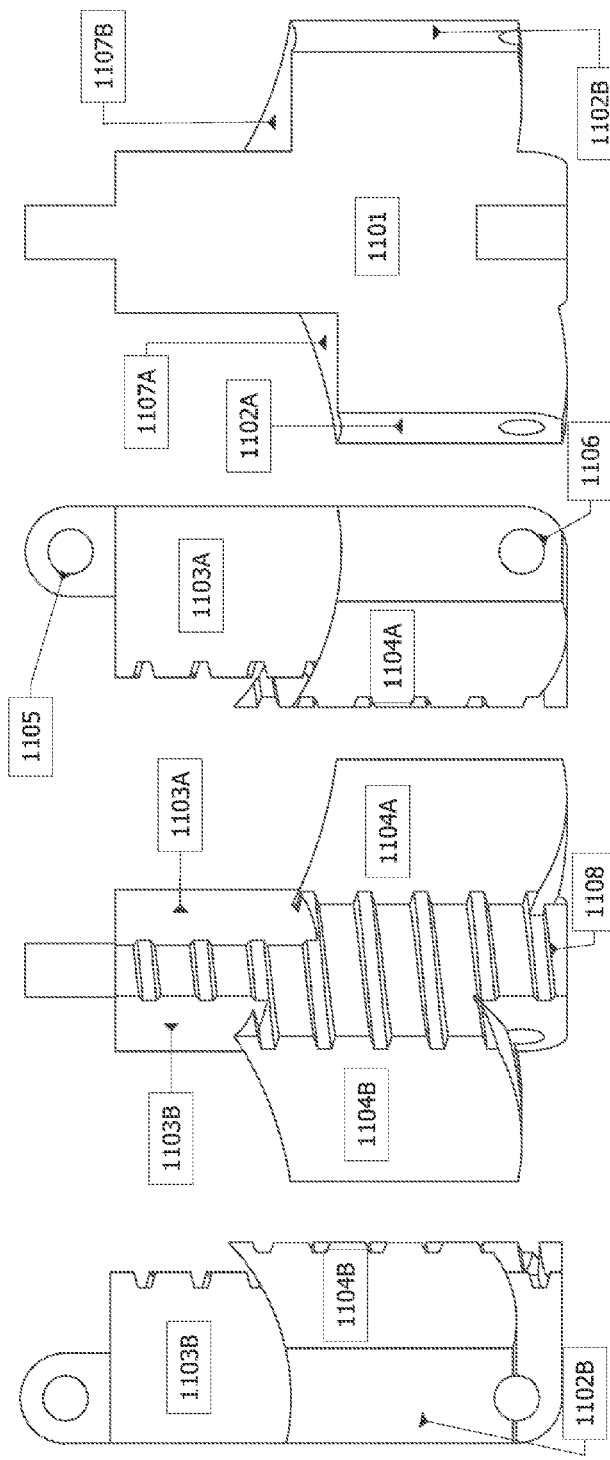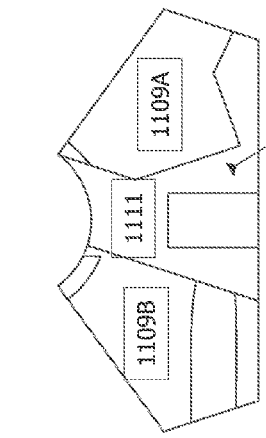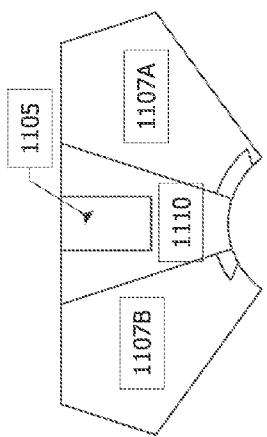

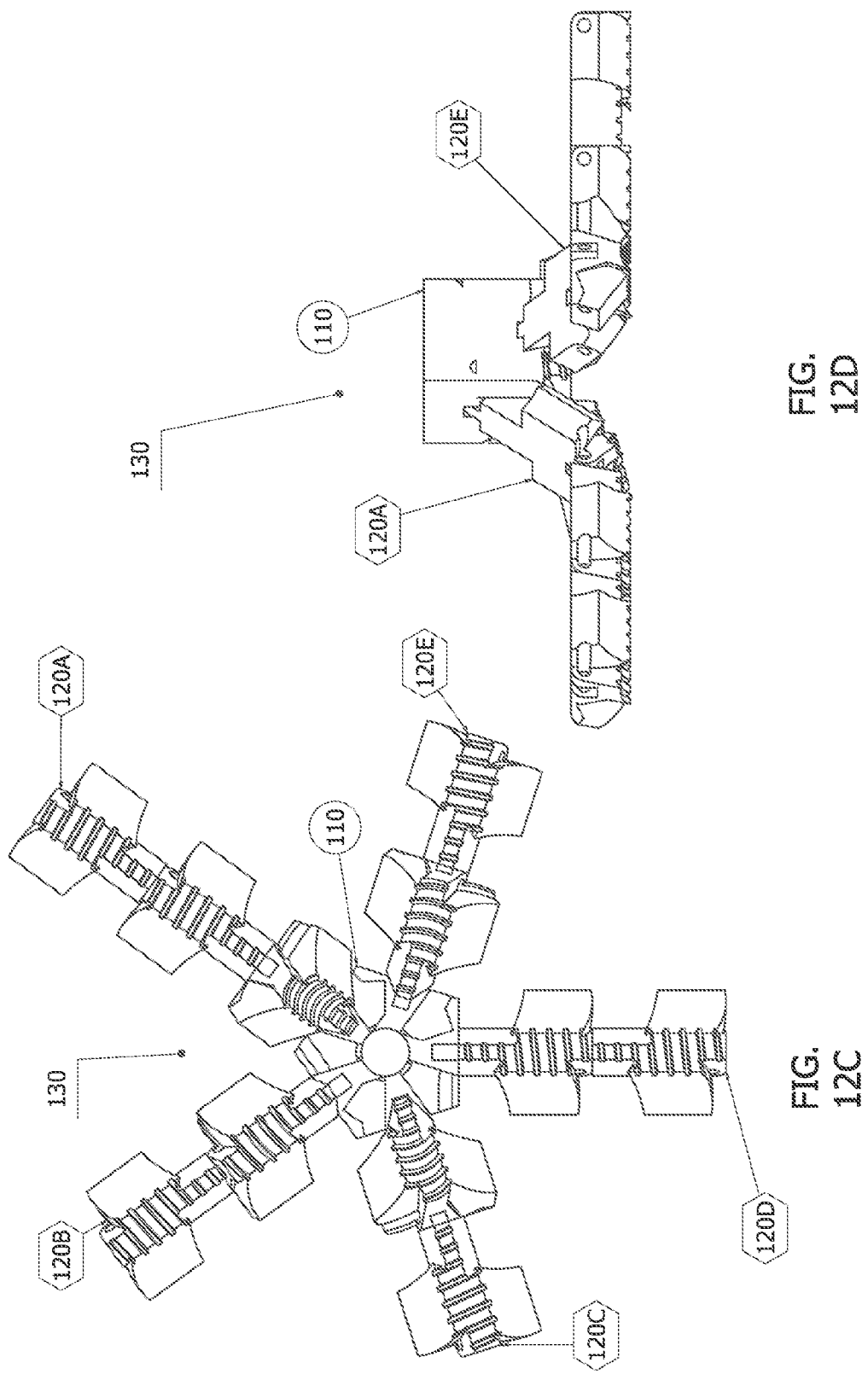

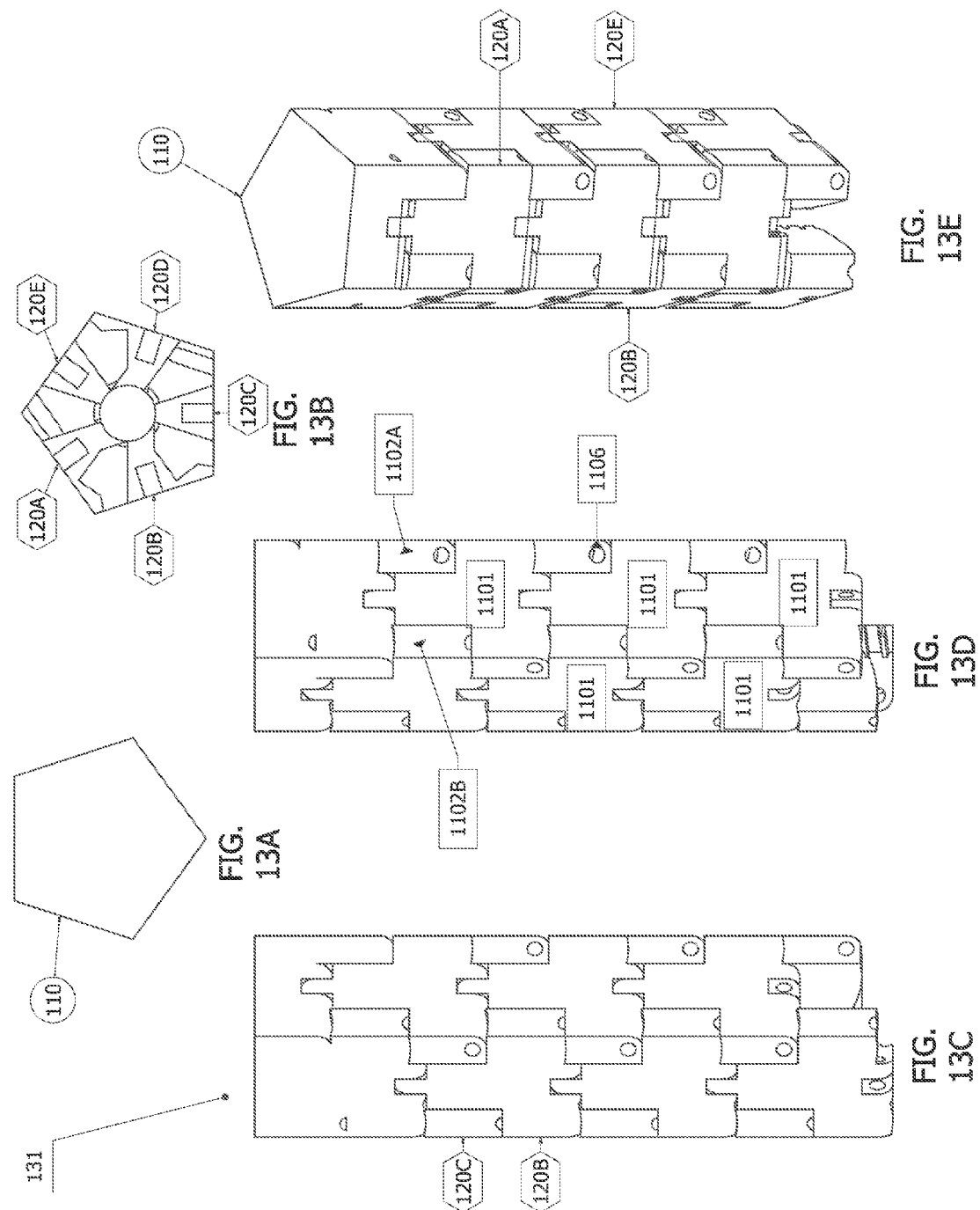

EXTENDABLE INTERLOCKING STRUCTURES AND METHODS

BACKGROUND

Extendable structures are a common occurrence and have applications in the industrial, commercial, consumer, and military markets. For example, an extendable structure may be used to position a cutting torch. The structure could also be used as an adjustable stop for locating material coming off of a conveyor. In a different application, the extension of the structure could engage in a properly sized hole, thus serving as a locking mechanism. Another example may be to mount electronic packages on an extendable structure including sensor devices, antennas, cameras, microphones, or the like for collecting data and/or transmitting data. Additionally, it could be used for entertainment or show purposes such that a structure may rise out of a stage or platform.

Various methods of producing extendable structures include telescoping structures, adding discrete sections to extend a structure, or a scissor-like structure. These structures, however, have limited final length based on the initial structure length, have non-uniform exteriors, have discrete length intervals, and/or require large footprints.

SUMMARY OF THE INVENTION

In accordance with an embodiment, an extendable structure includes a first chain of interlocking components including a first interlocking component, a second chain of interlocking components including a second interlocking component configured to mate to the bottom surface the first interlocking component, and a third chain of interlocking components including a third interlocking component configured to mate to the bottom surfaces of the first interlocking component and the second interlocking component.

In accordance with another embodiment, an extendable structure includes a first interlocking component. The first interlocking component includes a top face, a bottom face opposite the top face, the bottom face comprising a first portion, a second portion, and a third portion, the second portion being laterally between the first and third portions, a planar inner face intersecting the top face and the bottom face, the planar inner face including a short planar inner face and a tall planar inner face, the short planar inner face being laterally adjacent the tall planar inner face, a tall angled inner face intersecting the first and second portions of the bottom face, and a short angled inner face intersecting the second and third portions of the bottom face. The first interlocking component further includes an outer face intersecting the top face, the bottom face, the tall angled inner face, and the short angled inner face, a first ridge along the intersection between the top face and the planar inner face, a first groove along the intersection between the tall angled inner face and the first portion of the bottom face, and a second groove along the intersection between the short angled inner face and the third portion of the bottom face.

In accordance with yet another embodiment, a method of erecting an extendable structure includes joining a first interlocking component to a cap, the joining the first interlocking component includes mating a top face and planar inner faces of the first interlocking component to the cap, joining a second interlocking component to the cap and the first interlocking component, the joining the second interlocking component includes mating a top face of the second interlocking component to bottom faces of the cap and the first interlocking component, and mating planar inner faces of the second interlocking component to the cap and to angled inner faces of the first interlocking component. The method further includes joining a third interlocking component to the cap, the first interlocking component, and the second interlocking component, the joining the third interlocking component includes mating a top face of the third interlocking component to bottom faces of the cap, the first interlocking component, and the second interlocking component, and mating planar inner faces of the third interlocking component to angled inner faces of the first and the second interlocking components.

BRIEF DESCRIPTION OF THE DRAWINGS

For a more complete understanding of the present embodiments, and the advantages thereof, reference is now made to the following descriptions taken in conjunction with the accompanying drawings, in which:

FIG. 2A illustrates a top view of the interlocking component in FIGS. 1A through 1D according to an embodiment;

FIG. 2B illustrates a bottom view of the interlocking component in FIGS. 1A through 1D according to an embodiment;

FIG. 2C illustrates a side view of the interlocking component in FIGS. 1A through 1D according to an embodiment;

FIG. 2D illustrates a side view of the interlocking component in FIGS. 1A through 1D according to an embodiment;

FIG. 2E illustrates a front view of the interlocking component in FIGS. 1A through 1D according to an embodiment;

FIG. 2F illustrates a back view of the interlocking component in FIGS. 1A through 1D according to an embodiment;

FIG. 3A illustrates a perspective view of an extendable structure in a lowered configuration according to an embodiment;

FIG. 3B illustrates a top view of the extendable structure in FIG. 3A according to an embodiment;

FIG. 3C illustrates a bottom view of the extendable structure in FIG. 3A according to an embodiment;

FIG. 3D illustrates a side view of the extendable structure in FIG. 3A according to an embodiment;

FIG. 4A illustrates a perspective view of an extendable structure in an erected configuration according to an embodiment;

FIG. 4B illustrates a front view of the extendable structure in FIG. 4A according to an embodiment;

FIG. 4C illustrates a back view of the extendable structure in FIG. 4A according to an embodiment;

FIG. 7A illustrates a perspective view of a partially erected extendable structure according to an embodiment;

FIG. 7B illustrates a top view of the extendable structure in FIG. 7A according to an embodiment;

FIG. 8A illustrates a perspective view of a base for an extendable structure according to an embodiment;

FIG. 8B illustrates a top view of the base in FIG. 8A according to an embodiment;

FIG. 8C illustrates a bottom view of the base in FIG. 8A according to an embodiment;

FIG. 8D illustrates a side view of the base in FIG. 8A according to an embodiment;

FIG. 9E illustrates a top view of the interlocking component in FIGS. 9A through 9D according to an embodiment;

FIG. 9F illustrates a bottom view of the interlocking component in FIGS. 9A through 9D according to an embodiment;

FIG. 9G illustrates a side view of the interlocking component in FIGS. 9A through 9D according to an embodiment;

FIG. 9H illustrates a front view of the interlocking component in FIGS. 9A through 9D according to an embodiment;

FIG. 9I illustrates a side view of the interlocking component in FIGS. 9A through 9D according to an embodiment;

FIG. 9J illustrates a back view of the interlocking component in FIGS. 9A through 9D according to an embodiment;

FIG. 10A illustrates a perspective view of an extendable structure in a lowered configuration according to an embodiment;

FIG. 10B illustrates a top view of the extendable structure in FIG. 10A according to an embodiment;

FIG. 10C illustrates a bottom view of the extendable structure in FIG. 10A according to an embodiment;

FIG. 10D illustrates a side view of the extendable structure in FIG. 10A according to an embodiment;

FIG. 10E illustrates a top view of the extendable structure in FIG. 10H according to an embodiment;

FIG. 10F illustrates a bottom view of the extendable structure in FIG. 10H according to an embodiment;

FIG. 10G illustrates a side view of the extendable structure in FIG. 10H according to an embodiment;

FIG. 10H illustrates a perspective view of an extendable structure in an erected configuration according to an embodiment;

FIG. 11E illustrates a top view of the interlocking component in FIGS. 11A through 11D according to an embodiment;

FIG. 11F illustrates a bottom view of the interlocking component in FIGS. 11A through 11D according to an embodiment;

FIG. 11G illustrates a side view of the interlocking component in FIGS. 11A through 11D according to an embodiment;

FIG. 11H illustrates a front view of the interlocking component in FIGS. 11A through 11D according to an embodiment;

FIG. 11I illustrates a side view of the interlocking component in FIGS. 11A through 11D according to an embodiment;

FIG. 11J illustrates a back view of the interlocking component in FIGS. 11A through 11D according to an embodiment;

FIG. 12C illustrates a bottom view of the extendable structure in FIG. 12A according to an embodiment;

FIG. 12D illustrates a side view of the extendable structure in FIG. 12A according to an embodiment;

FIG. 13A illustrates a top view of the extendable structure in FIG. 13E according to an embodiment;

FIG. 13B illustrates a bottom view of the extendable structure in FIG. 13E according to an embodiment;

FIG. 13C illustrates a side view of the extendable structure in FIG. 13E according to an embodiment;

FIG. 13D illustrates a side view of the extendable structure in FIG. 13E according to an embodiment;

FIG. 13E illustrates a perspective view of an extendable structure in an erected configuration according to an embodiment.

DETAILED DESCRIPTION OF ILLUSTRATIVE EMBODIMENTS

Figure 1A:
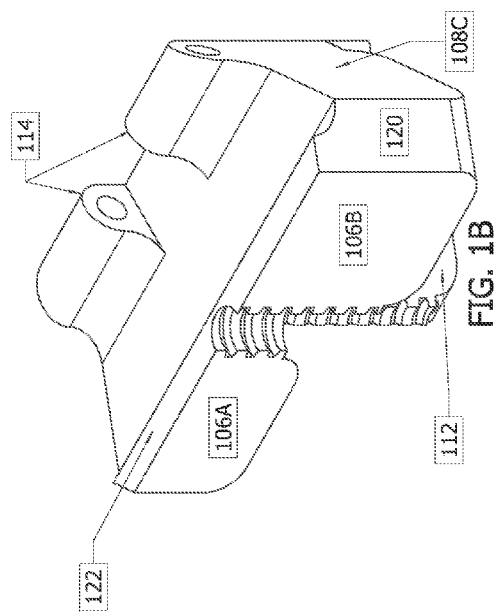
FIGS. 1A through 1D illustrate perspective views of an interlocking component according to an embodiment.
Figure 1B:
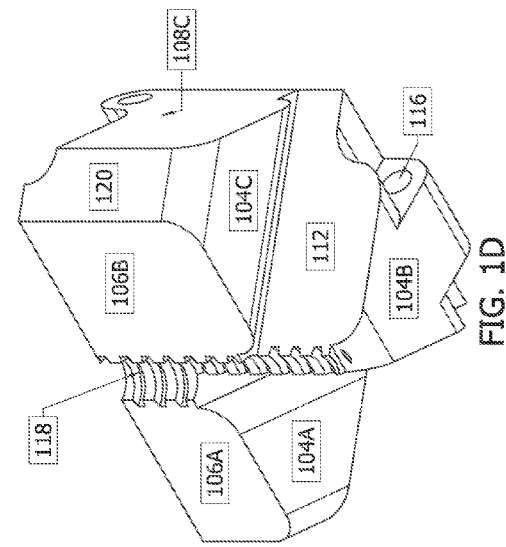
Figure 1C:
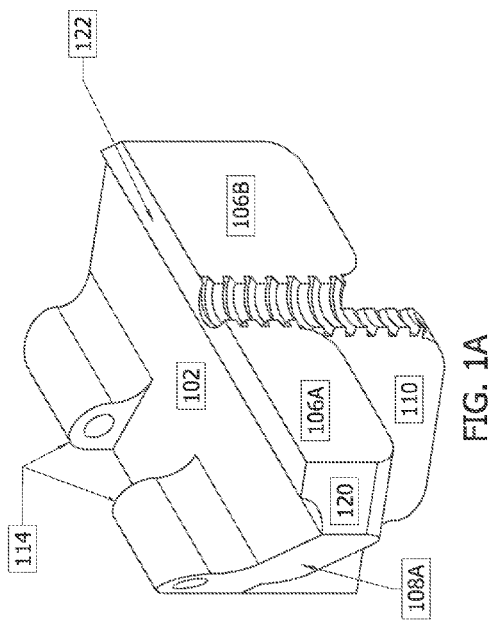
Figure 1D:
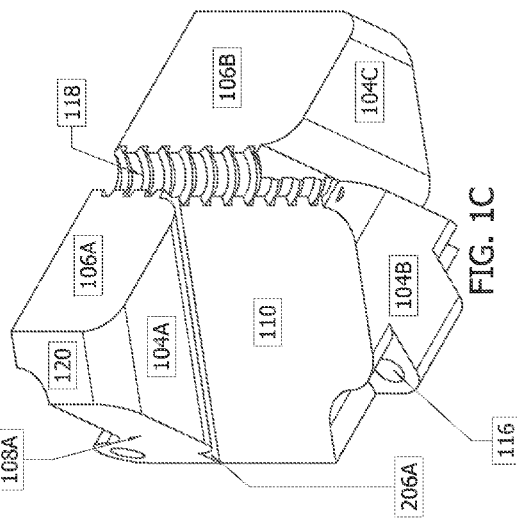

An embodiment is an extendable structure includes a plurality of interlocking components which are linked together to form the extendable structure. The interlocking components may be connected in series in three or more chains of interconnecting components that become rigid when the chains come together and interlock. The embodiments below describe a three chain structure for illustration purposes, although more than three chains may be used. The chains of interlocking components comprise identical interlocking components that are linked together via hinges at the top and bottom of the components. The resulting structure may be threaded, on an outer face or an inner face, such that the extension and/or retraction of the structure may be powered by a threaded gear. The height of the structure may be manipulated by the rotation of the threaded gear. The chains may be combined into a structure by an interlocking base. This base controls the orientation of the unlocked interlocking components so that they will be aligned when interlocked with the other interlocking components. Additionally, the base can serve as the mount for affixing the structure. The free end of the structure can be a cap, or simply the first interlocking components that have been interlocked. The cap could provide a safety mechanism to ensure the structure does not go below a certain height and could also serve as the location to mount another object such as a platform, basket, electronic package, or the like. The extendable structure may be used for any of the applications or used described herein.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

FIGS. 1A through 1D illustrate perspective views of an interlocking component 10 according to an embodiment. In an embodiment, the interlocking component 10 may comprise metal, plastic, wood, rubber, ceramic, the like, or a combination thereof, although any suitable material may be used. Examples of metals are aluminum, titanium, steel, the like, or a combination thereof. The interlocking component 10 may be a solid structure or may be a hollow structure depending on the requirements of the application.

The interlocking component 10 includes a top face 102, a bottom face 104 (including 104A, 104B, and 104C), a planar inner face 106 (including a short planar inner face 106A and a tall planar inner face 106B), an outer face 108 (including 108A, 108B, and 108C), a tall angled inner face 110, and a short angled inner face 112. A ridge 122 is at the intersection of the planar inner faces 106 and the top face 102 with corresponding grooves 206A, 206B, and 206C (see FIG. 2B) at the intersections of the angled inner faces 110 and 112 and the bottom faces 104A and 104C. The ridge 122 and the matching grooves 206A and 206C are configured such that the ridge 122 engages the grooves 206A and 206C of adjacent interlocking components 10 to lock the interlocking components 10 to each other (see FIGS. 4A through 4C).

The interlocking component 10 may further includes a top hinge 114 on the top face 102, a bottom hinge 116 on the bottom face 104B, a channel 118, and beveled corners 120. In some embodiments, the beveled corners 120 may be omitted and the faces 108C and 106B may directly intersect and the faces 108A and 106A may directly intersect. As illustrated the channel 118 is a threaded semicircle such that the interlocking components may be manipulated by a threaded gear. In some embodiments, the channel 118 may be smooth and may comprise seals to allow it carry fluid. In some embodiments, the channel 118 may contain wires to transmit electrical or optical signals. In some other embodiments, the channel 118 may be omitted and the short planar inner face 106A and the tall planar inner face 106B may be a single continuous planar inner face 106.

The top and bottom hinges 114 and 116 link additional interlocking components 10 above and below the interlocking component 10 to form a chain of interlocking components 10 (see FIGS. 3A through 3D). The top and bottom hinges 114 and 116 allow rotation of the interlocking components 10 such that the outer faces 108 of linked interlocking components 10 will move towards each other and may be coiled. As illustrated the top and bottom hinges 114 and 116 include openings and pins in the openings to link the interlocking components 10. The pins may comprise plastic, metal, wood, ceramic, rubber, the like, or a combination thereof. In some embodiments, the top and bottom hinges may be moved toward the planar inner faces 106 such that linked interlocking components 10 may be coiled towards the outer faces 108 or the planar inner faces 106. In some embodiments, the top and bottom hinges 114 and 116 may be covered by the interlocked components such that the hinge is not accessible while the extendable structure is erected. In other embodiments, the hinge may not have a pin, but instead be a connection such as a snap together indent/protrusion, ball and socket joint, gimbal joint, or other method of connecting the blocks that allows at least one degree of freedom. In other embodiments, the top and bottom hinges 114 and 116 may be omitted and a flexible material such as a tape may be along the outer faces 108 of the interlocking components 10.

Figure 6B:
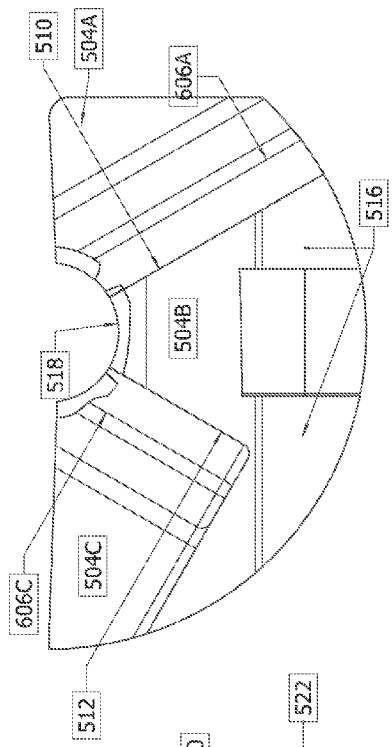
FIG. 6B illustrates a bottom view of the interlocking component in FIGS. 5A and 5B according to an embodiment.
Figure 6D:
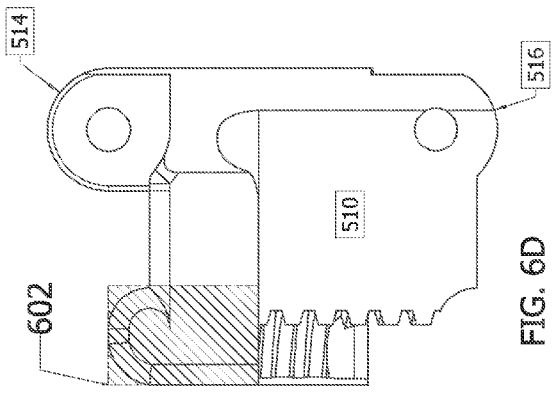
FIG. 6D illustrates a side view of the interlocking component in FIGS. 5A and 5B according to an embodiment.
Figure 6A:
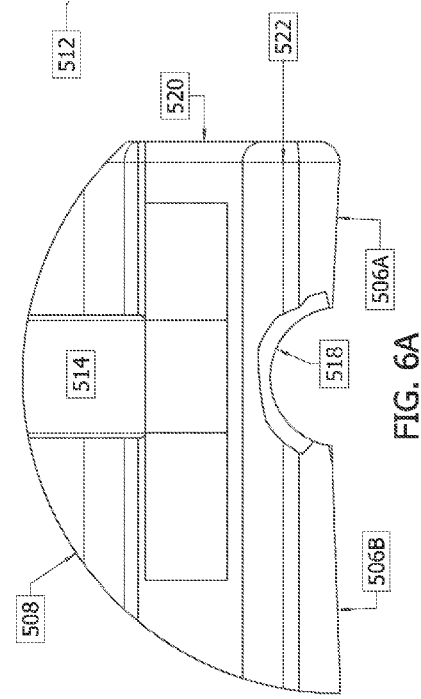
FIG. 6A illustrates a top view of the interlocking component in FIGS. 5A and 5B according to an embodiment.

FIGS. 2A and 2B illustrate top and bottom views, respectively, of the interlocking component 10 according to an embodiment. As illustrated the outer face 108 comprises three sections 108A, 108B, and 108C, although the outer face 108 may comprise a single continuous face (see FIGS. 6A and 6B) or may comprise more sections as necessary. When viewed from the bottom, the interlocking component 10 may be divided into left, center, and right thirds with the grooves 206A and 206C being substantially along the intersections of the adjacent thirds. In an embodiment, the center third is the full height of the interlocking component 10 and the top face 102 and the bottom face 104B of the center third mate with a top face 102 and a bottom face 104B of the center thirds of adjacent linked interlocking components 10 (see FIGS. 4A through 4C). In this embodiment, the left third (see short interlocking element 202) is about ⅓ of the height of the interlocking component 10 and the top face 102 and the bottom face 104A of the left third mate with a top face 102 and a bottom face 104C of the right thirds of adjacent linked interlocking components 10 (see FIGS. 4A through 4C). In this embodiment, the right third (see tall interlocking element 204) is about ⅔ of the height of the interlocking component 10 and the top face 102 and the bottom face 104C of the right third mate with a top face 102 and a bottom face 104A of the left thirds of adjacent linked interlocking components 10 (see FIGS. 4A through 4C). As one of ordinary skill in the art would understand, the left and right thirds may be interchanged.

Although, the adjoining faces and structures of interlocking components 10 are described as "mated," this does not mean that the entirety of the adjoining faces or structures are in contact with each other. Rather, the adjoining faces may be designed to have a small gap between portions of the adjoining faces to reduce manufacturing costs and allow for debris.

FIGS. 2C and 2D illustrate side views of the interlocking component 10 according to an embodiment. FIGS. 2E and 2F illustrate front and back views, respectively, of the interlocking component 10 according to an embodiment. The interlocking component 10 comprises a short interlocking element 202 and a tall interlocking element 204. The short interlocking element 202 comprises the outer face 108A, the short planar inner face 106A, the bottom face 104A, the groove 206A, and corresponding portions of the ridge 122 and the top face 102. The tall interlocking element 204 comprise the outer face 108C, the tall planar inner face 106B, the bottom face 104C, the groove 206C, and corresponding portions of the ridge 122 and the top face 102. As discussed below, the short interlocking element 202 and the tall interlocking element 204 mate with each other in the erected extendable structure 30 (see FIG. 4A through 4C) such that the bottom face of one mates with the top face of the other. As viewed from the bottom (see FIG. 2B), the short interlocking element 202 and the tall interlocking element 204 have a substantially triangular shape.

A height $H_1$ (also referred to as the functional height $H_1$) as illustrated in FIG. 2C is the distance between the top face 102 and the bottom face 104B of the interlocking component 10. In an embodiment, the interlocking component 10 may have an overall height $H_2$ that is greater than the functional height $H_1$. The functional height $H_1$ may be increased to reduce the cost by reducing the number of interlocking components 10 for a given height of the extendable structure 30. An increased functional height $H_1$ may cause an increased height and width of the base (discussed below) and an increased minimum height $H_3$ of the extendable structure 30 (see FIG. 3D). The functional height $H_1$ may be designed in accordance with the application of the extendable structure 30. If the extendable structure 30 is to be extended and retracted using threads (see channel 118 of FIGS. 1A through 1D), the functional height $H_1$ should be equal to the pitch of the screw multiplied by the sum of an integer times the number of chains plus 1. For example, with 10 threads per inch (pitch of 0.1") and three chains, the functional height $H_1$ could be 0.4", 0.7", 1.0", 1.3", and so on.

FIGS. 3A, 3B, 3C, and 3D illustrate a perspective view, a top view, a bottom view, and a side view, respectively, of an extendable structure 30 in a lowered configuration according to an embodiment. The extendable structure 30 comprises a cap 20 attached to three chains 310A, 310B, and 310C of interlocking components 10 with each chain comprising a plurality of interlocking components 10. In an embodiment, the cap 20 is at the leading end of the extendable structure 30. The bottom of the cap 20 is designed to mimic three interlocking components 10 of the different chains fused together in their interlocked positions. The top of the cap 20 may be adapted per the application. The cap may have an opening 302 which may align with the channel 118 of the interlocking components 10. In these embodiments, the opening 302 may be threaded similar to the channel 118 to allow a threaded gear to extend and retract the extendable structure 30. The cap 20 may be fitted with one or more of any number of mechanisms, such as a caster, a torch, a paint nozzle, a blade, an electronic eye, a magnet, a sensor, an electronic package, a camera, an antenna, a microphone, a platform, a basket, the like, or a combination thereof.

The outer faces 108 may also be threaded or smooth (see FIGS. 6A through 7C) depending on the desired functionality. The outer faces 108 may interface with a base (not shown) discussed below, but may not mate to another interlocking component 10 while formed as the erected extendable structure 30. The erected extendable structure 30 exterior face is formed by the outer faces 108 of the three chains (see FIG. 4A). The exterior face of the extendable structure 30 can be most shapes that are symmetric along the extending axis when divided by the number of chains. For example, in an embodiment with three chains, the exterior face of the extendable structure 30 can be most shapes that are symmetric in thirds along the extending axis, such as circular, triangular, curvilinear triangle, hexagonal, a six sided star, or the like. As another example, in an embodiment with four chains, the exterior face of the extendable structure 30 can be most shapes that are symmetric in fourths along the extending axis, such as circular, square, octagonal, or the like. Additionally, the outer face may be irregular such as to provide rails to allow a carriage to move up and down the structure. In some embodiments, the extendable structure 30 may include a base 70 (see FIGS. 8A through 8E) as described below.

FIGS. 4A, 4B, and 4C illustrate a perspective view, a front view, and a back view, respectively, of an erected extendable structure 30 according to an embodiment. The assembly of the erected extendable structure 30 of FIGS. 4A through 4C will be discussed starting from extendable structure 30 in a lowered configuration of FIG. 3B. FIG. 3B illustrates three chains 310A, 310B, and 310 attached to a cap 20. Each chain 310A, 310B, and 310C comprises a plurality of interlocking components 10. Each of the interlocking components 10 have been uniquely labeled, for example, the interlocking components 10 of the chain 310A are 310A1, 310A2, 310A3, and 310A4. The other two chains 310B and 310C have similarly labeled interlocking components 10.

Beginning the assembly of the erected extendable structure 30, the top faces 102 of the short interlocking element 202, the tall interlocking element 204, and the center third of component 310A1 mate with the cap 20. Next, the top faces 102 of the short interlocking element 202 and center third of the component 310B1 mate with the cap 20, and the top face 102 of the tall interlocking element 204 of the component 310B1 mates with the bottom face 104A of the short interlocking element 202 of the component 310A1. Additionally, the tall planar inner face 106B of the component 310B1 mates to the tall angled inner face 110 of the component 310A1, and the ridge 122 of the tall interlocking element 204 of the component 310B1 engages with the groove 206A of the component 310A1. Next, the top face 102 of the short interlocking element 202 of the component 310C1 mates to the bottom face 104C of the component 310A1, the top face 102 of the center third of the component 310C1 mates to the cap 20, and the top face 102 of the tall interlocking element 204 of component 310C1 mates to the bottom face 104A of the component 310B1. Additionally, the short planar inner face 106A of the component 310C1 mates to the short angled inner face 112 of component 310A1, the tall planar inner face 106B of the component 310C1 mates to the tall angled inner face 110 of the component 310B1, the ridge 122 of the short interlocking element 202 of component 310C1 engages with the groove 206C of component 310A1, and the ridge 122 of the tall interlocking element 204 of component 310C1 engages with the groove 206A of component 310B1.

Next, the assembly of the erected extendable structure 30 continues with the component 310A2, 310B2, 310C2, 310A3, and so on until the desired height of the erected extendable structure 30 is reached. Component 310A2 is the first interlocking component 10 that is not in contact with the cap 20 as the top face of 310A2 mates with thirds of bottom faces of 310A1, 310B1, and 310C1. Although, in the illustrated embodiment, the extendable structure 30 is extended in a vertical direction, the orientation of the extendable structure 30 may be vertical, horizontal, diagonal, or any direction in between. Further, the interlocking components of the extendable structure 30 could be designed that the bottom surface of the extendable structure 30 is substantially flat (similar to the top in this embodiment) and the top has varying levels (similar to the bottom in this embodiment). The faces, ridges, and grooves of the interlocking components would be inverted to change orientation, but these changes are within the scope of the present disclosure.

In some embodiments, the interlocking component 10 may be formed of separate parts rather than a single component as illustrated. For example, the interlocking component 10 may comprise an outer portion with the outer face 108 and the hinges 114 and 116 and an inner portion comprising the inner faces 106, 110, 112 and the channel 118. This multi-part configuration may allow for a reduction of cost, weight, and/or an increase in strength.

Further, the interlocking component 10 may comprise conductive materials and may be used to conduct electricity up and down the extendable structure 30. For example, each of the three chains of interlocking components 310A, 310B, and 310C could be or could contain a power, a ground, a neutral, or a transmission line. In some other embodiments, the chains 310A, 310B, and 310C may each comprise a single, continuous piece of flexible material instead of a plurality of interlocking components.

Figure 5B:
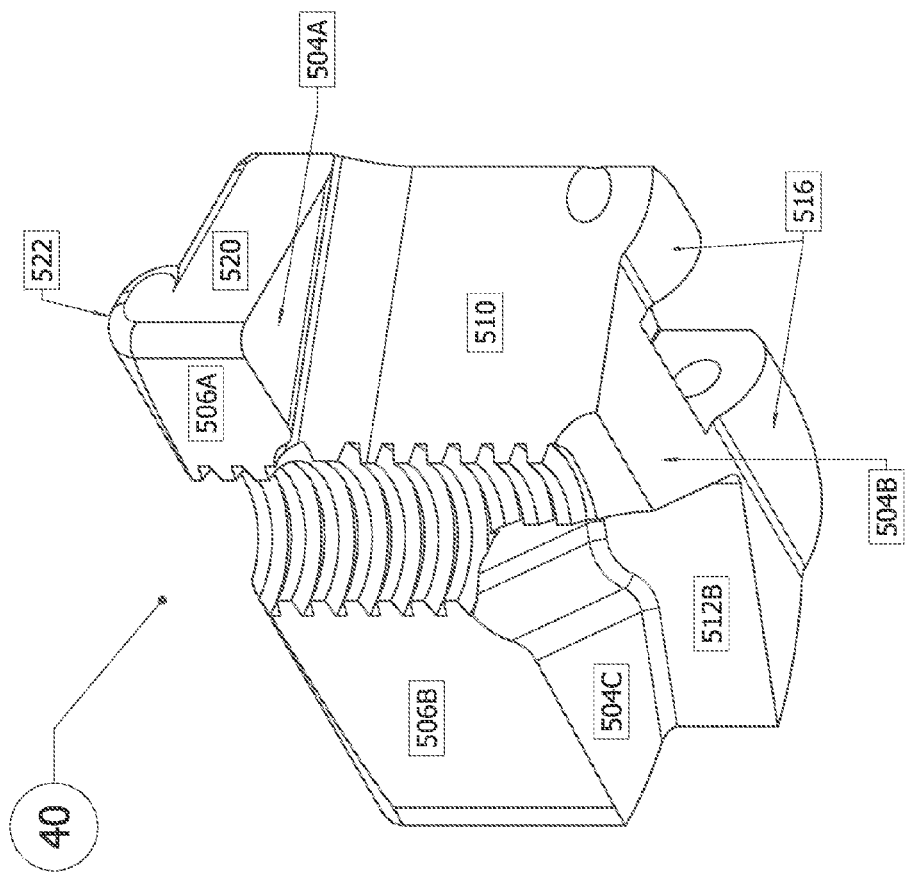
FIGS. 5A and 5B illustrate perspective views of an interlocking structure according to an embodiment.
Figure 5A:
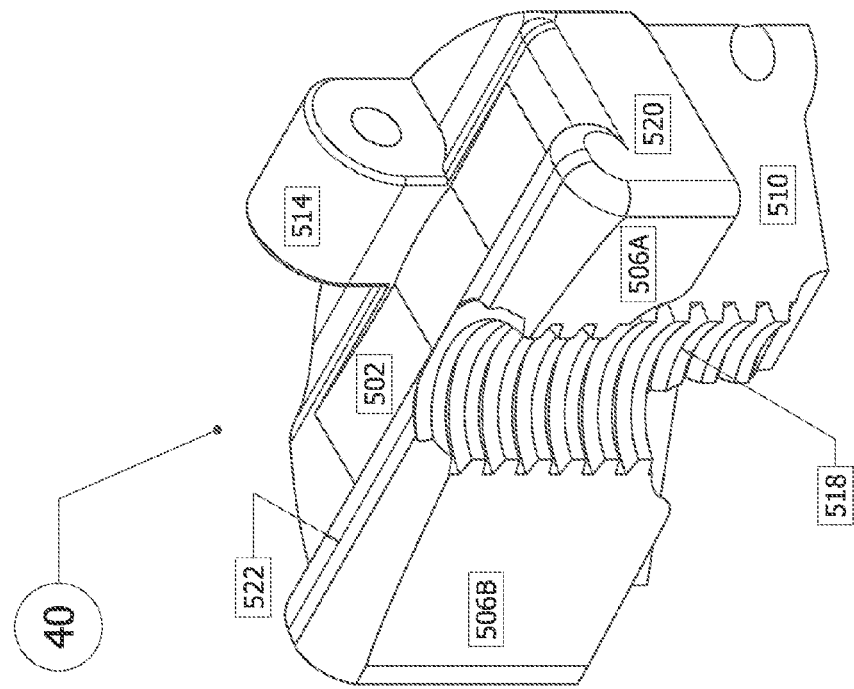

FIGS. 5A and 5B illustrate perspective views of an interlocking component 40 according to another embodiment wherein the outer face of the interlocking component 40 is rounded or curved. Details regarding this embodiment that are similar to those for the previously described embodiment will not be repeated herein.

The interlocking component 40 may include a top face 502, a bottom face 504 (including 504A, 504B, and 504C), a planar inner face 506 (including a short planar inner face 506A and a tall planar inner face 506B), an outer face 508, a side face 520, a tall angled inner face 510, a first short angled inner face 512A, and a second short angled inner face 512B. The faces mate in a similar manner as described in the previous embodiment except this embodiment includes the side face 520 which mates with the second short angled inner face 512B and the short planar inner face 506A mates with the first short angled inner face 512A (see FIG. 6B). A ridge 522 is at the intersection between the planar inner faces 506 and the top face 502 with corresponding grooves 606A and 606B (see FIG. 6B) at the intersection between the angled inner faces 510 and 512 and the bottom faces 504A and 504C. The ridge 522 and the matching grooves 606A and 606B served to lock the interlocking components to each other (see FIGS. 7A through 7D).

The hinges top and bottom hinges 514 and 516 and the channel 518 may be similar to the top and bottom hinges 114 and 116 and the channel 118 described above and the descriptions are not repeated herein.

Figure 6C:
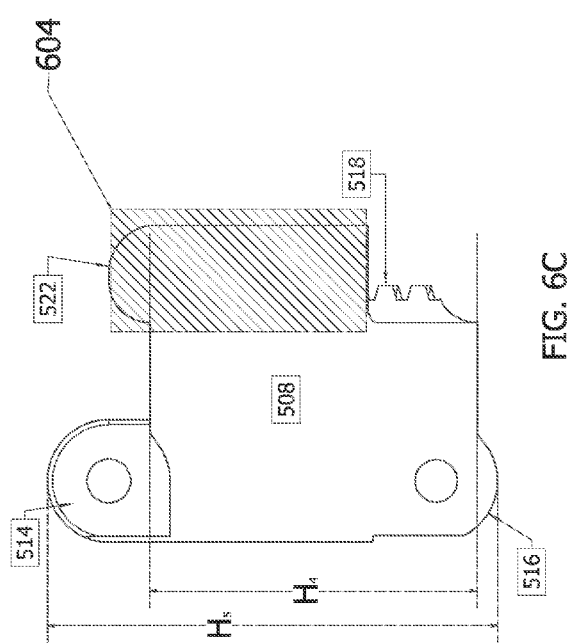
FIG. 6C illustrates a side view of the interlocking component in FIGS. 5A and 5B according to an embodiment.
Figure 6F:
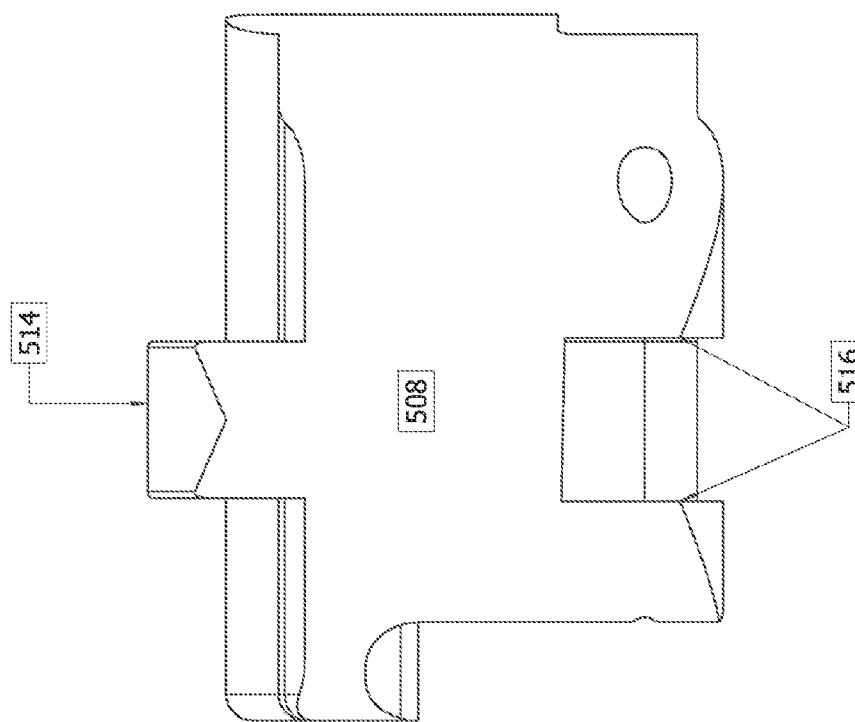
FIG. 6F illustrates a back view of the interlocking component in FIGS. 5A and 5B according to an embodiment.
Figure 6E:
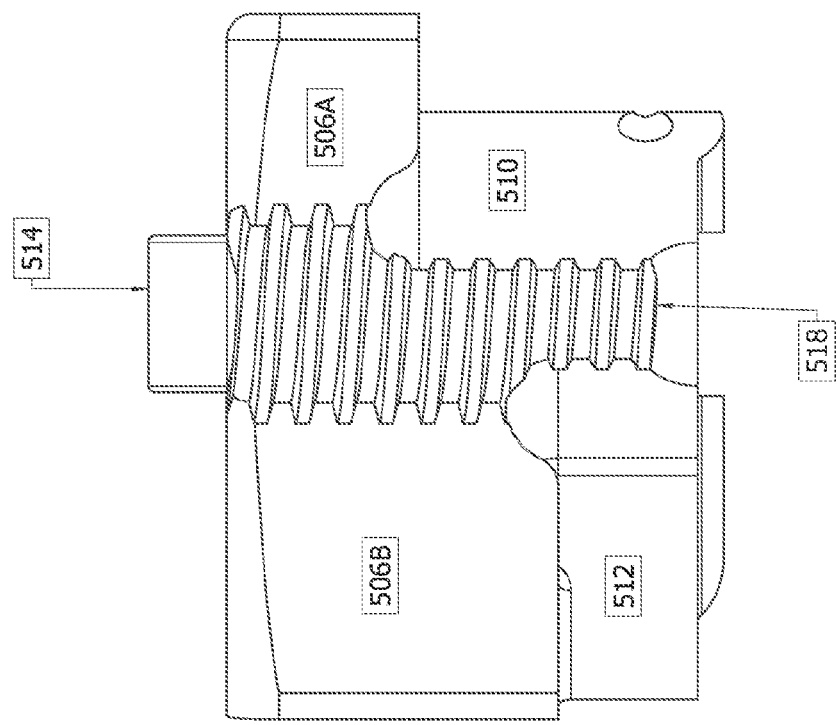
FIG. 6E illustrates a front view of the interlocking component in FIGS. 5A and 5B according to an embodiment.
Figures 7C, 7D:
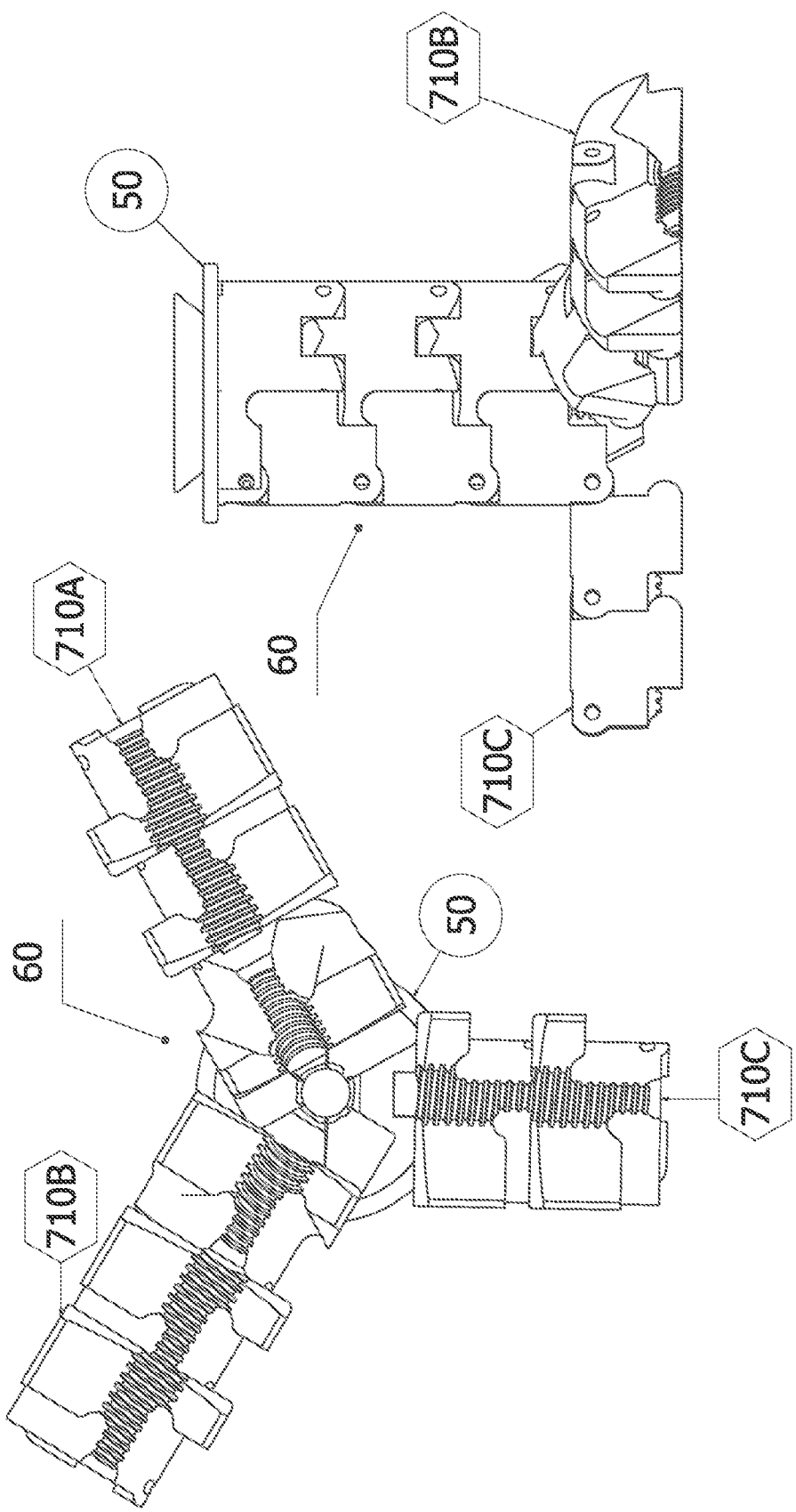
FIG. 7C illustrates a bottom view of the extendable structure in FIG. 7A according to an embodiment.
FIG. 7D illustrates a side view of the extendable structure in FIG. 7A according to an embodiment.
Figure 8E:
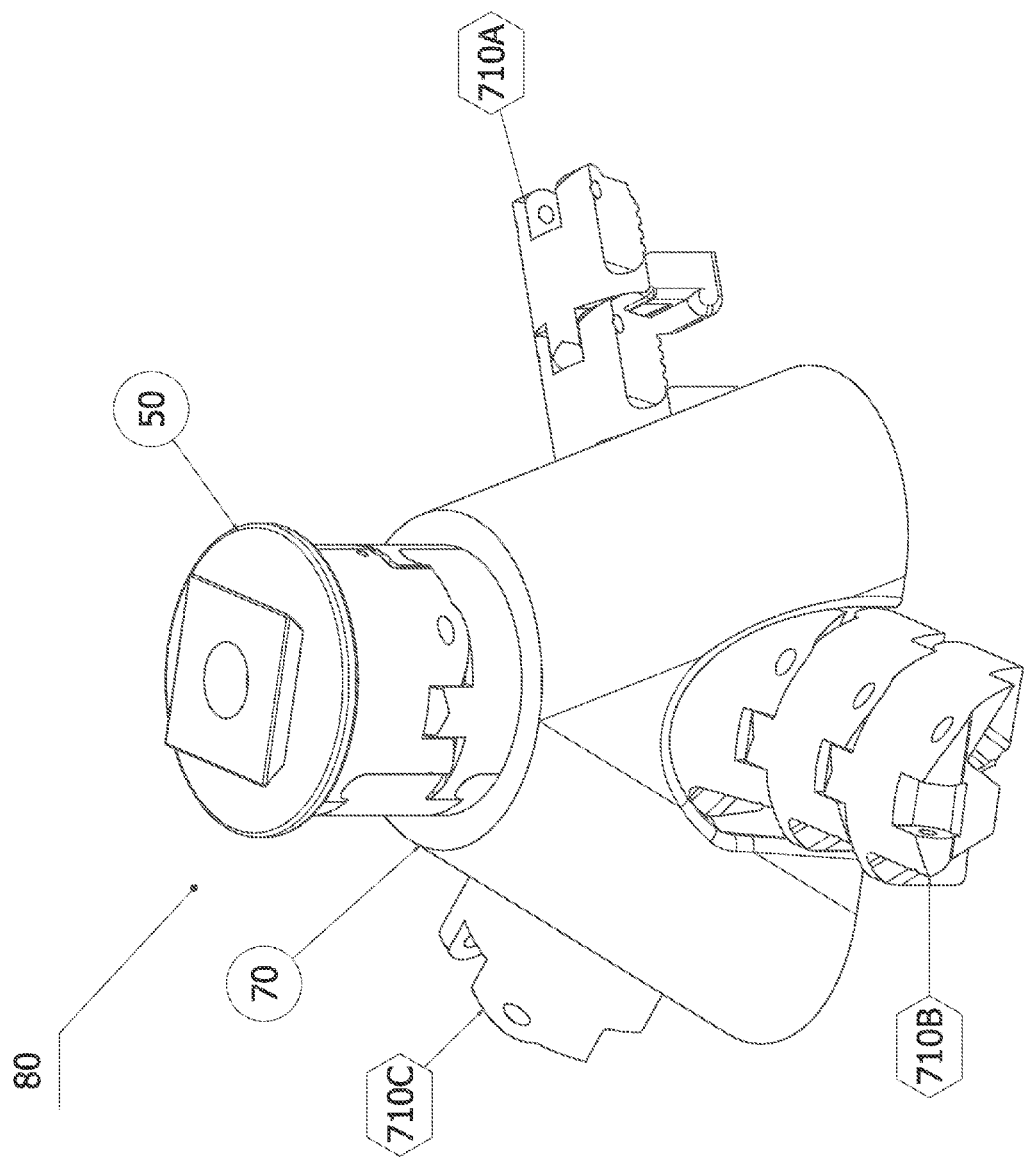
FIG. 8E illustrates a perspective view of an extendable structure with a base according to an embodiment.

FIGS. 6A, 6B, 6C, 6D, 6E, and 6F illustrate a top view, a bottom view, a side view, a side view, a front view, and a back view of the interlocking component 40 according to an embodiment. The interlocking component 40 has a functional height $H_4$ as illustrated in FIG. 6C as the distance between the top face 502 and the bottom face 504B of the interlocking component 40. In an embodiment, the interlocking component 40 may have an overall height $H_5$ that is greater than the functional height $H_4$.

FIGS. 7A, 7B, 7C, and 7D illustrate a perspective view, a top view, a bottom view, and a side view, respectively, of an extendable structure 60 in a partially erected configuration according to an embodiment. Details regarding this embodiment that are similar to those for the previously described embodiment will not be repeated herein.

The extendable structure 60 comprises a cap 50 attached to three chains 710A, 710B, and 710C of interlocking components 40 with each chain comprising a plurality of interlocking components 40. The extendable structure 60 may include a base 70 (see FIGS. 8A through 8E) and may be erected similar to the previous embodiment.

FIGS. 8A, 8B, 8C, and 8D illustrate a perspective view, a top view, a bottom view, and a side view of a base 70 according to an embodiment. FIG. 8E illustrates the extendable structure 60 with the base 70 at the trailing end (end opposite the cap 50) of the extendable structure 60. The base may be used to align the interlocking components 40 of the chains 710 so that they interlock. It may have four openings; three openings 812A, 812B, and 812C that allow the chains 710 to be input and the fourth opening 810 is an output to allow the erected extendable structure 60 (see FIG. 8E) to extend out from the base. In operation the extendable structure may both extend and retract. In some embodiments, the interlocking components 40 may lock into place during extension such that the extendable structure 60 is not able to retract. During retraction, the chains 710 may extend from the inputs 812 and the erected extendable structure 60 may be input into the output 810. In an embodiment, the output opening 810 may surround and be proximate to the outer faces 508 of the erected extendable structure 60 in order to provide support for the erected extendable structure 60. In some embodiments, the base 70 can be extended further up the erected extendable structure 60 to provide additional stability, but this may cause an increase to the height of the extendable structure 60 in a lowered configuration (see FIGS. 3A through 3D and 7D).

The base 70 may also allow for a method of attaching the extendable structure 60 to another object. The method of attaching the base 70 would depend on the application, but could be numerous methods including, welding, adhesive, mechanical fasteners, the like, or a combination thereof. Another purpose of the base 70 is to provide the power source to extend and retract the extendable structure 60. The aforementioned threaded faces on the outer faces 508 or the channel 518 of the extendable structure 60 may be driven by a threaded collar or screw. The method of driving the screw or collar, the gear arrangement, and the gearing ratio are all chosen per application using standard design criteria. The base 70 may provide storage for the unlocked chains, such as coiling the chains 710. In some embodiments, both the channel 518 and the outer faces 508 may be threaded. In those embodiments, for example, the threaded channel 518 may allow for extension and retraction of the extendable structure 60 while the threaded outer faces 508 allow for movement of attached devices up and down the extendable structure 60. In some embodiments, the interior and/or exterior faces may have features other than threads, such as holes that could be used to secure or lock the structure at a specified height.

FIGS. 9A through 9D illustrate perspective views of an interlocking component according to another embodiment wherein the interlocking component is configured to be assembled into an extendable structure 100 with four chains (see FIGS. 10A through 10H). Details regarding this embodiment that are similar to those for the previously described embodiment will not be repeated herein.

The interlocking component in FIGS. 9A through 9D may have an outer face 901, inner faces 903A and 903B, an upper hinge 909, a lower hinge 912, a channel 908 laterally between the inner faces 903A and 903B, curved top face 911 laterally between curved upper faces 904A and 904B, curved lower faces 907A and 907B, planar lower face 906 laterally between curved lower faces 907A and 907B, inner side faces 905A and 905B, and outer side faces 902A and 902B.

When connected in a chain 910 (see FIGS. 10A through 10H) upper hinge 912 will align with the lower hinge 912 of the interlocking component above. The outer side faces 902A and 902B of each interlocking component in the chain 910 will be flush with the other interlocking components in the chain 910.

Figure 9B:
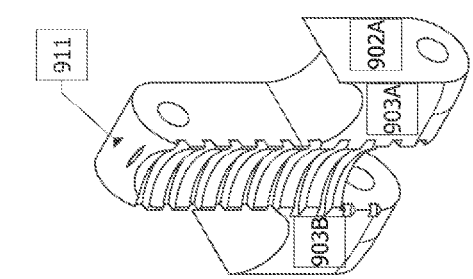
FIGS. 9A through 9D illustrate perspective views of an interlocking component according to an embodiment.
Figure 9D:
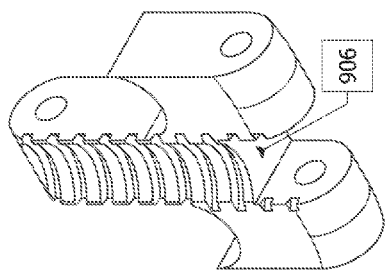
Figure 9A:
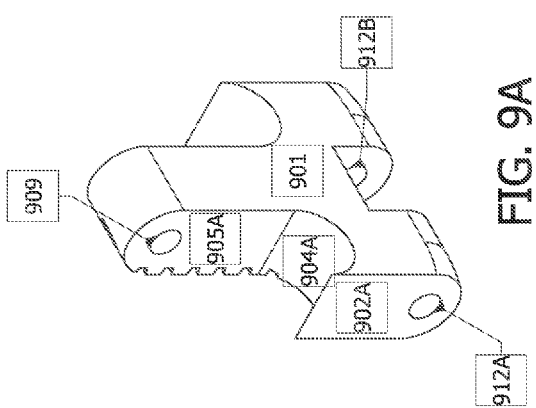
Figure 9C:
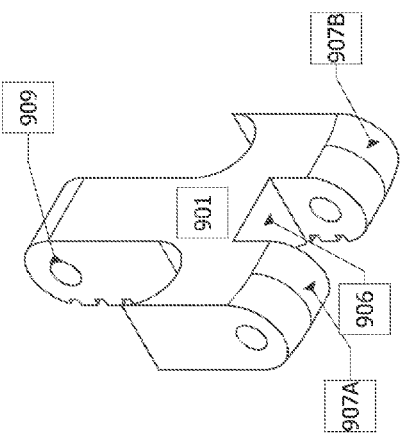
Figure 11D:
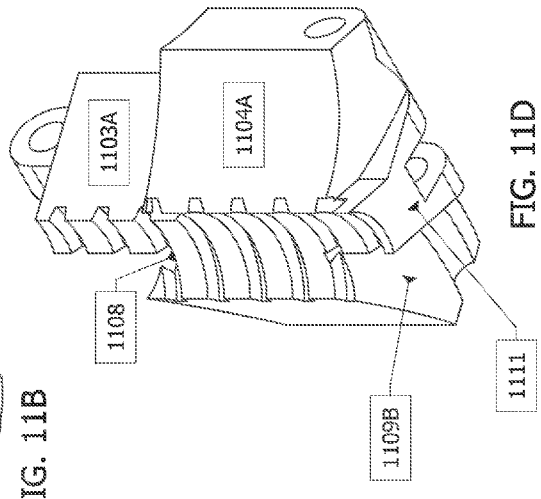
FIGS. 11A through 11D illustrate perspective views of an interlocking component according to an embodiment.
Figure 11B:
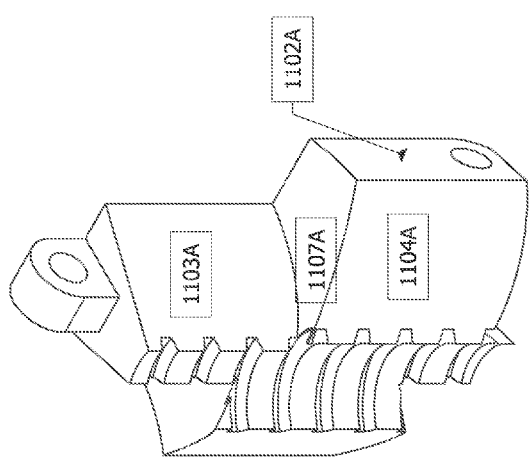
Figure 11C:
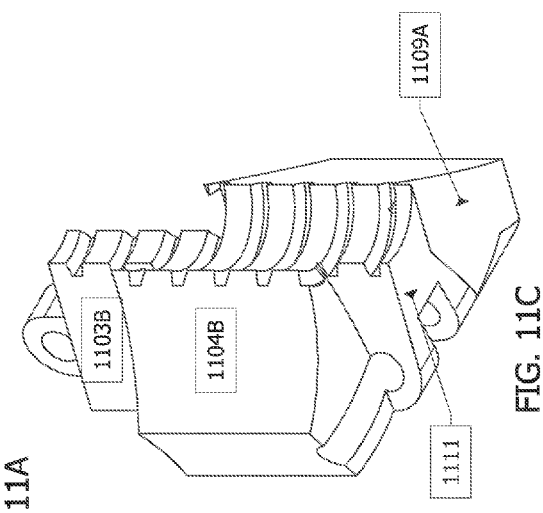
Figure 11A:
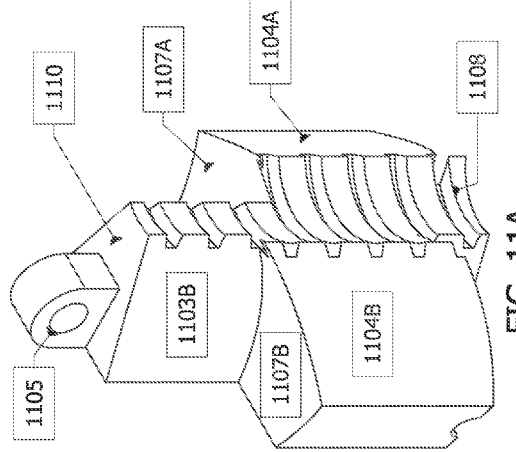
Figures 12A, 12B:
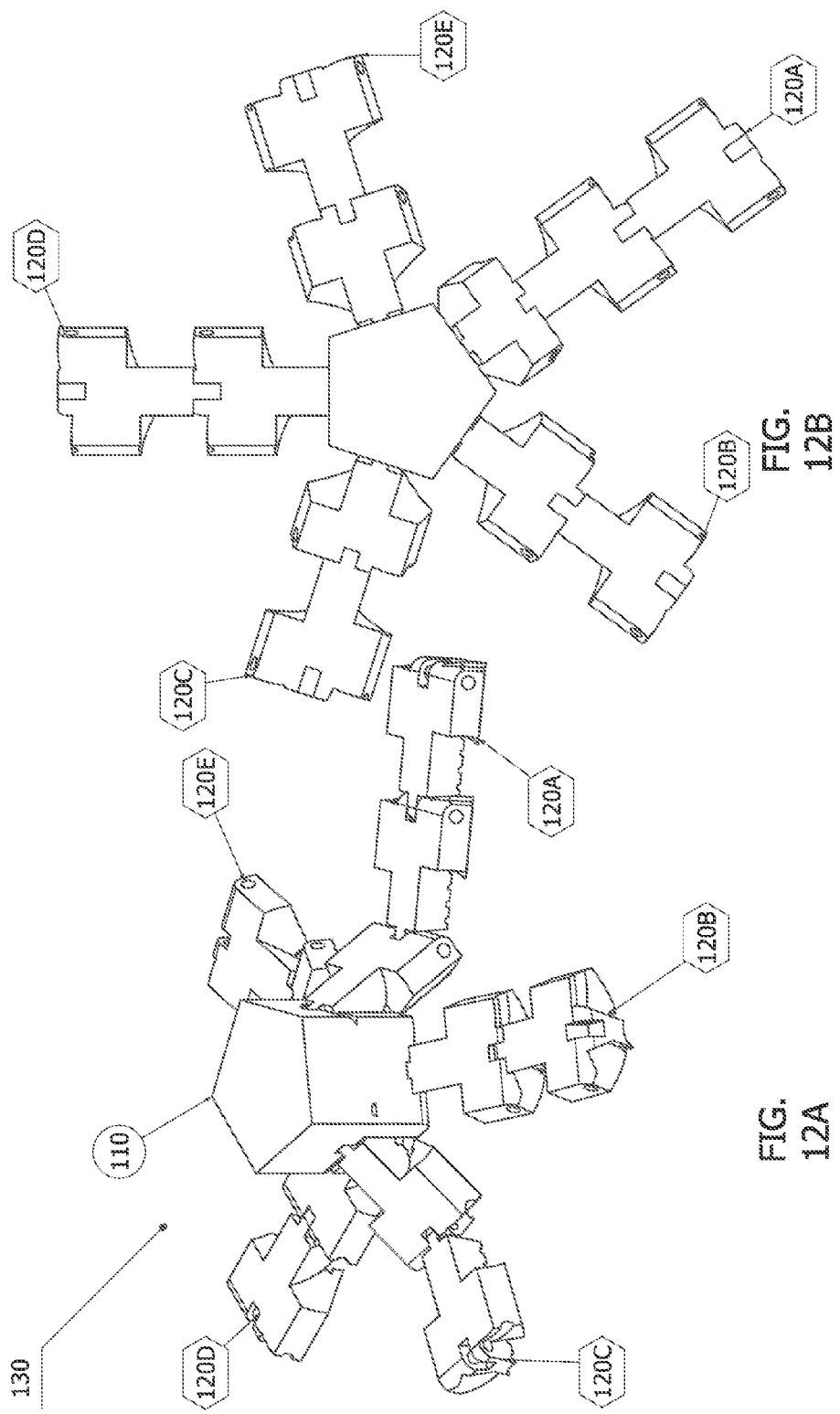
FIG. 12A illustrates a perspective view of an extendable structure in a lowered configuration according to an embodiment.
FIG. 12B illustrates a top view of the extendable structure in FIG. 12A according to an embodiment.

FIGS. 9E, 9F, 9G, 9H, 9I, and 9J illustrate a top view, a bottom view, a side view, a front view, a side view, and a back view of the interlocking in FIGS. 9A through 9D according to an embodiment. The interlocking component has a functional height $H_7$ as illustrated in FIG. 9G as the distance between centers of the top hinge 909 and the bottom hinge 912 of the interlocking component. In an embodiment, the interlocking component may have an overall height $H_8$ that is greater than the functional height $H_7$.

FIGS. 10A through 10H illustrate various views of an extendable structure 100 with a cap 90 and chains 910 linked to the cap. The four chain extendable structure 100 comprises four chains 910 of identical interlocking components that link at a cap. The four chains are labeled 910A, 910B, 910C, and 910D and are in order when viewed from above in a clockwise direction. The chain 910A is the chain that is highest up on the cap 90. In an embodiment, the four chain extendable structure 100 has ½ height increments between corresponding faces of adjacent interlocking components. Due to these increments, the order of interlocking components being joined to the extendable structure is from chains 910A and 910C simultaneously followed by chains 910B and 910D simultaneously, so on until the desired height of the extendable structure 100 is reached. In another embodiment, the corresponding faces of the adjacent interlocking components may increment down in ¼ height increments, and in this embodiment the interlocking components would be joined to the extendable structure from chains 910A, 910B, 910C, and 910D sequentially until the desired height of the extendable structure 100 is reached.

When assembled to make the extendable structure 100, the chains will be connected to a cap, or otherwise held together at the top by other means. The chains 910A, 910B, 910C, and 910D will join to form an extendable structure 100. The upper curved surfaces 904A and 904B of chain 910A mate to the lower curved surfaces 907A and 907B of interlocking components of adjacent chains. The face 904A of chain 910A mates to the face 907B of chain 910B and face 904B of chain 910A mates to face 907A of chain 910D. Additionally, the inner face 903A mates of chain 910A mates to 905B of chain 910B and face 903B of chain 910A to face 905B of chain 910B. The threaded faces of all the chains come together to form a relatively continuous surface for which to drive the extension and/or retraction of the extendable structure 100. The faces 901, 902A, and 902B make up the external sides of the extended structure 100.

FIGS. 11A through 11D illustrate perspective views of an interlocking component according to an embodiment. The interlocking component in FIGS. 11A through 11J is for a five chain extendable structure 130. In this embodiment, the interlocking component has a ⅖ step down to the right. The interlocking component has an outer face 1101, lower inner faces 1104A and 1104B, upper inner faces 1103A and 1103B, an upper hinge 1105, a lower hinge 1106, an upper curved faces 1107A and 1107B, an internal threaded surface 1108, lower faces 1109A and 1109B, bottom face 1111 laterally between 1109A and 1109B, a top face 1110, a channel 1108, and outer side faces 1102A and 1102B.

When linked in a chain the upper hinge 1105 of the lower interlocking component will be inserted into the lower hinge 1106 of the interlocking component above. When linked and assembled into an extended structure, the top face 1110 of the lower interlocking component mates to the bottom face 1111 of the upper interlocking component and the outer faces 1101, 1102A, and 1102B may be flush.

FIGS. 11E, 11F, 11G, 11H, 11I, and 11J illustrate a top view, a bottom view, a side view, a front view, a side view, and a back view of the interlocking in FIGS. 11A through 11D according to an embodiment.

FIGS. 12A through 12D and 13A through 13E illustrate various views of an extendable structure 130 with a cap 110 and chains 120 linked to the cap 110. The five chain extendable structure 130 comprises five chains of identical interlocking components that are linked to the cap 110. The chains are labeled 120A, 120B, 120C, 120D, and 120E are in order when viewed from above in a clockwise direction. The chain 120A is the chain that is highest up on the cap 110. The design of the interlocking component may vary based on the vertical distance the adjacent block should be offset or incremented. The offset or increment may be any multiple of the inverse to the number of chains. In the current example of five chains, the adjoining chain to the right may be ⅕, ⅖, ⅗, ⅘, or 5/5 of the functional height lower than the current interlocking component. It is worth noting that ⅕ lower to the right is the same as ⅘ lower to the left, so ⅕ and ⅘ and ⅖ and ⅗ are similar except that the extendable structure would have either a clockwise or counterclockwise twist. In the current embodiment, the five chain interlocking component increments down in ⅖ increments. Due to this increment, the order of interlocking components being joined to form the extendable structure 130 is from chains 120A, 120C, 120E, 120B, 120D, and so on until the desired height of the extendable structure 130 is reached.

When assembled to make the extendable structure 130, the chains 120 may be connected to a cap, or otherwise held together, at the top by other means. The chains 120A, 120B, 120C, 120D, and 120E will join to form an extendable structure 130. The upper curved faces 1107 of chain 120A mate to the lower curved faces 1109 of the adjacent chains. For example, the faces 1107A of chain 120A mates to faces 1109B of chain 120B and face 1107B of chain 120 mates to 1109A of chain 120E. Additionally, the inner faces 1103A and 1104A of chain 120A mate to 1104B and 1103B, respectively, of chain 120B. The inner faces 1103B and 1104B of chain 120A mate to 1104A and 1103A, respectively, of chain 120E. The threaded faces of all the chains join to form a relatively continuous surface for which to drive the extension, and/or retraction of the extendable structure 130. The outer faces 1101, 1102A, and 1102B make up the external sides of the extended structure 130.

The number of interlocking components 10 and 40, the number of chains 310 and 710, and the number of hinges 114, 116, 514, and 516 are only for illustrative purposes and are not limiting. There could be any other number interlocking components in a chain that is more or less than the number of interlocking components illustrated. There may be any other number of chains per extendable structure other than the three chains per extendable structure illustrated. For example, there may be seven, eight, nine, ten, or even fifteen chains per extendable structure. In fact, there may be any number of chains.

Advantages of increasing the number of chains are, for example, greater flexibility with the design of the outer surface of the extended structure. Also, the width and depth of the interlocking components may be reduced for a given extendable structure diameter.

A consideration when designing an extendable structure with a different number of chains is how much of the height to step down from one adjacent chain to the next. The increments may be 1/x for a component comprising x number of chains. It has been found that an increment closest to ⅓ would be a good starting point. The ⅓ increment disperses the seams along the extended structure which, when not dispersed, could serve as a weak point. Additionally, the ⅓ increment allows for the minimal interference of a component being joined into the extended structure by the adjacent chains.

The disclosed extendable structure comprising the disclosed interlocking components provides a continuous and uniform exterior. Also, the maximum height of the extendable structure is only limited by the number of interlocking components linked together. Further, the system or method of extending and retracting the extendable structure is flexible and thus may allow the extendable structure to be used in applications unsuitable for other extendable structures.

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An extendable structure comprising:
   a first chain of interlocking components comprising a first interlocking component, the first interlocking component comprising:
   a top face;
   a bottom face opposite the top face, the bottom face comprising a first portion, a second portion, and a third portion, the second portion being laterally between the first and third portions;
   a planar inner face intersecting the top face and the bottom face, the planar inner face comprising a short planar inner face and a tall planar inner face, the short planar inner face being laterally adjacent the tall planar inner face;
   a tall angled inner face intersecting the first and second portions of the bottom face;
   a short angled inner face intersecting the second and third portions of the bottom face;
   an outer face intersecting the top face, the bottom face, the tall angled inner face, and the short angled inner face;
   a first ridge along the intersection between the top face and the planar inner face;
   a first groove along the intersection between the tall angled inner face and the first portion of the bottom face; and
   a second groove along the intersection between the short angled inner face and the third portion of the bottom face;
   a second chain of interlocking components comprising a second interlocking component configured to mate to the bottom face of the first interlocking component; and
   a third chain of interlocking components comprising a third interlocking component configured to mate to bottom faces of the first interlocking component and the second interlocking component.

2. The extendable structure of claim 1, wherein each of the first chain, the second chain, and the third chain comprises three or more interlocking components.

3. The extendable structure of claim 1, wherein the first chain of interlocking components further comprises a fourth interlocking component linked to the first interlocking component, the fourth interlocking component configured to mate to the first, the second, and the third interlocking components.

4. The extendable structure of claim 3, wherein the fourth interlocking component is linked to the first interlocking component by a hinge.

5. The extendable structure of claim 3, wherein the first interlocking component and the fourth interlocking component comprise a continuous piece of flexible material.

6. The extendable structure of claim 1, wherein each of the first, the second, and the third interlocking components comprises at least six faces.

7. The extendable structure of claim 1 further comprising a cap, the first, second, and third interlocking components being linked to the cap, and the first, second, and third interlocking components being configured to mate to a bottom surface of the cap.

8. The extendable structure of claim 1 further comprising a threaded channel extending through the first, the second, and the third interlocking components, wherein each of the first, the second, and the third interlocking components comprises a portion of the threaded channel.

9. An extendable structure comprising:
   a first interlocking component comprising:
   a top face;
   a bottom face opposite the top face, the bottom face comprising a first portion, a second portion, and a third portion, the second portion being laterally between the first and third portions;
   a planar inner face intersecting the top face and the bottom face, the planar inner face comprising a short planar inner face and a tall planar inner face, the short planar inner face being laterally adjacent the tall planar inner face;
   a tall angled inner face intersecting the first and second portions of the bottom face;
   a short angled inner face intersecting the second and third portions of the bottom face;
   an outer face intersecting the top face, the bottom face, the tall angled inner face, and the short angled inner face;
   a first ridge along the intersection between the top face and the planar inner face;
   a first groove along the intersection between the tall angled inner face and the first portion of the bottom face; and
   a second groove along the intersection between the short angled inner face and the third portion of the bottom face.

10. The extendable structure of claim 9 further comprising:
    a second interlocking component comprising a second ridge, the second ridge configured to engage at least one of the first and second grooves.

11. The extendable structure of claim 10, wherein the second interlocking component is physically identical to the first interlocking component.

12. The extendable structure of claim 9 further comprising a threaded channel laterally between the tall and short planar inner faces, the threaded channel extending from the top face to the second portion of the bottom face.

13. The extendable structure of claim 9, wherein the planar inner face is orthogonal to the top face, and wherein the short angled inner face and the tall angled inner face are both orthogonal to the top face.

14. The extendable structure of claim 9, wherein the first portion, the second portion, and the third portion of the bottom face are a first distance, a second distance, and a third distance, respectively, from the top face, the second distance being greater than then third distance, the third distance being greater than the first distance.

15. The extendable structure of claim 9 further comprising:
    a first chain of a first plurality of linked interlocking components, the first plurality of linked interlocking components includes the first interlocking component, each of the first plurality of linked interlocking components being identical;
    a second chain of a second plurality of linked interlocking components, each of the second plurality of linked interlocking components being identical to the first interlocking component; and
    a third chain of a third plurality of linked interlocking components, each of the third plurality of interlocking components being identical to the first interlocking component.

16. A method of erecting an extendable structure, the method comprising:

joining a first interlocking component to a cap, the first interlocking component comprising:
  a top face;
  a bottom face opposite the top face, the bottom face comprising a first portion, a second portion, and a third portion, the second portion being laterally between the first and third portions;
  a planar inner face intersecting the top face and the bottom face, the planar inner face comprising a short planar inner face and a tall planar inner face, the short planar inner face being laterally adjacent the tall planar inner face;
  a tall angled inner face intersecting the first and second portions of the bottom face;
  a short angled inner face intersecting the second and third portions of the bottom face;
  an outer face intersecting the top face, the bottom face, the tall angled inner face, and the short angled inner face;
  a first ridge along the intersection between the top face and the planar inner face;
  a first groove along the intersection between the tall angled inner face and the first portion of the bottom face; and
  a second groove along the intersection between the short angled inner face and the third portion of the bottom face, the joining the first interlocking component comprising:
    mating the top face, the short planar inner face, and the tall planar inner face of the first interlocking component to the cap;
joining a second interlocking component to the cap and the first interlocking component, the joining the second interlocking component comprising:
  mating a top face of the second interlocking component to bottom faces of the cap and the first interlocking component;
  mating planar inner faces of the second interlocking component to the cap and to the tall angled inner face of the first interlocking component; and
joining a third interlocking component to the cap, the first interlocking component, and the second interlocking component, the joining the third interlocking component comprising:
  mating a top face of the third interlocking component to bottom faces of the cap, the first interlocking component, and the second interlocking component; and
  mating planar inner faces of the third interlocking component to the short angled inner face of the of the first interlocking component and an angled inner face of the second interlocking component.

17. The method of claim 16, wherein the first, the second, and the third interlocking components are identical to each other.

18. The method of claim 16 further comprising:
joining a fourth interlocking component to the first interlocking component, the second interlocking component, and the third interlocking component, the joining the fourth interlocking component comprising:
  mating a top face of the fourth interlocking component to bottom faces of the first interlocking component, the second interlocking component, and the third interlocking component;
  mating planar inner faces of the fourth interlocking component to angled inner faces of the second interlocking component and the third interlocking component;
joining a fifth interlocking component to the second interlocking component, the third interlocking component, and the fourth interlocking component, the joining the fifth interlocking component comprising:
  mating the top face of the fifth interlocking component to bottom faces of the second interlocking component, the third interlocking component, and the fourth interlocking component;
  mating planar inner faces of the fifth interlocking component to angled inner faces of the third interlocking component and the fourth interlocking component; and
joining a sixth interlocking component to the third interlocking component, the fourth interlocking component, and the fifth interlocking component, the joining the sixth interlocking component comprising:
  mating a top face of the sixth interlocking component to bottom faces of the third interlocking component, the fourth interlocking component, and the fifth interlocking component; and
  mating planar inner faces of the sixth interlocking component to angled inner faces of the fourth interlocking component and the fifth interlocking component.

19. The method of claim 18 further comprising:
linking the first interlocking component and the fourth interlocking component to form a first chain of interlocking components:
linking the second interlocking component and the fifth interlocking component to form a second chain of interlocking components; and
linking the third interlocking component and the sixth interlocking component to form a third chain of interlocking components.

20. The method of claim 16, wherein each of the first, the second, and the third interlocking components comprises at least six faces.

* * * * *